United States Patent
Gauthier et al.

(10) Patent No.: US 10,478,720 B2
(45) Date of Patent: Nov. 19, 2019

(54) DYNAMIC ASSETS FOR CREATING GAME EXPERIENCES

(71) Applicant: Unity IPR ApS, Copenhagen K (DK)

(72) Inventors: Andre Gauthier, Saint-Lambert (CA); Dominic Laflamme, Hudson (CA); Pierre-Paul Giroux, Montreal (CA); Wayne Johnson, Copenhagen (DK); David Geoffroy, Laval (CA)

(73) Assignee: Unity IPR ApS, Copenhagen K (DK)

( * ) Notice: Subject to any disclaimer, the term of this patent is extended or adjusted under 35 U.S.C. 154(b) by 157 days.

(21) Appl. No.: 15/460,004

(22) Filed: Mar. 15, 2017

(65) Prior Publication Data
US 2017/0270702 A1 Sep. 21, 2017

Related U.S. Application Data

(60) Provisional application No. 62/308,785, filed on Mar. 15, 2016.

(51) Int. Cl.
*A63F 13/35* (2014.01)
*G06F 8/38* (2018.01)
*A63F 13/63* (2014.01)

(52) U.S. Cl.
CPC .............. *A63F 13/35* (2014.09); *A63F 13/63* (2014.09); *G06F 8/38* (2013.01)

(58) Field of Classification Search
CPC . G06T 13/40; G06F 8/38; A63F 13/63; A63F 13/35
See application file for complete search history.

(56) References Cited

U.S. PATENT DOCUMENTS

| | | | |
|---|---|---|---|
| 2002/0063713 A1* | 5/2002 | Sowizral | G06T 15/005 345/440 |
| 2003/0148806 A1* | 8/2003 | Weiss | G07F 17/32 463/20 |

(Continued)

OTHER PUBLICATIONS

Make your own game with RPG maker https://web.archive.org/web/20160314121240/http://www.rpgmakerweb.com/ (Year: 2016).*

(Continued)

*Primary Examiner* — Andrea N Long
(74) *Attorney, Agent, or Firm* — Schwegman Lundberg & Woessner, P.A.

(57) ABSTRACT

A system includes a memory, processors, and an asset player module configured to identify a playable asset configuration for a first playable asset, including a first graph configuration identifying processing nodes and edges, each node in the graph configuration represents a media processing component configured to modify media inputs to generate a media output, construct a graph in the memory based on the first graph configuration, receive a first set of media inputs, execute the media processing components in an order based on the graph configuration and using the first set of media inputs as the one or more input media components, based on said executing, generate a media output configured to be played by a conventional media player, alter the graph at runtime, thereby changing the media processing components identified within the graph, and execute the media processing components of the graph after the altering.

20 Claims, 22 Drawing Sheets

(56) References Cited

U.S. PATENT DOCUMENTS

| | | | | |
|---|---|---|---|---|
| 2003/0222870 | A1* | 12/2003 | Driemeyer | G06T 15/005 345/426 |
| 2007/0060346 | A1* | 3/2007 | Edwards | A63F 13/10 463/31 |
| 2008/0034400 | A1* | 2/2008 | Allen | H04N 1/00127 725/146 |
| 2012/0147011 | A1* | 6/2012 | Harper | G06T 1/20 345/440 |
| 2015/0088977 | A1* | 3/2015 | Monesson | H04L 65/605 709/203 |
| 2016/0323482 | A1* | 11/2016 | Chung | H04N 5/9265 |
| 2016/0367893 | A1* | 12/2016 | Shipkov | A63F 13/25 |

OTHER PUBLICATIONS

Create Games with Construct 2—Scirra.com https://web.archive.org/web/20160308041630/https://www.scirra.com/construct2 (Year: 2016).*

Make 2D Games with Game Maker_YoYo Games https://web.archive.org/web/20160314132309/http://www.yoyogames.com/ (Year: 2016).*

Gamefroot_game creator social and mobile gaming https://web.archive.org/web/20160314092257/https://www.gamefroot.com/ (Year: 2016).*

* cited by examiner

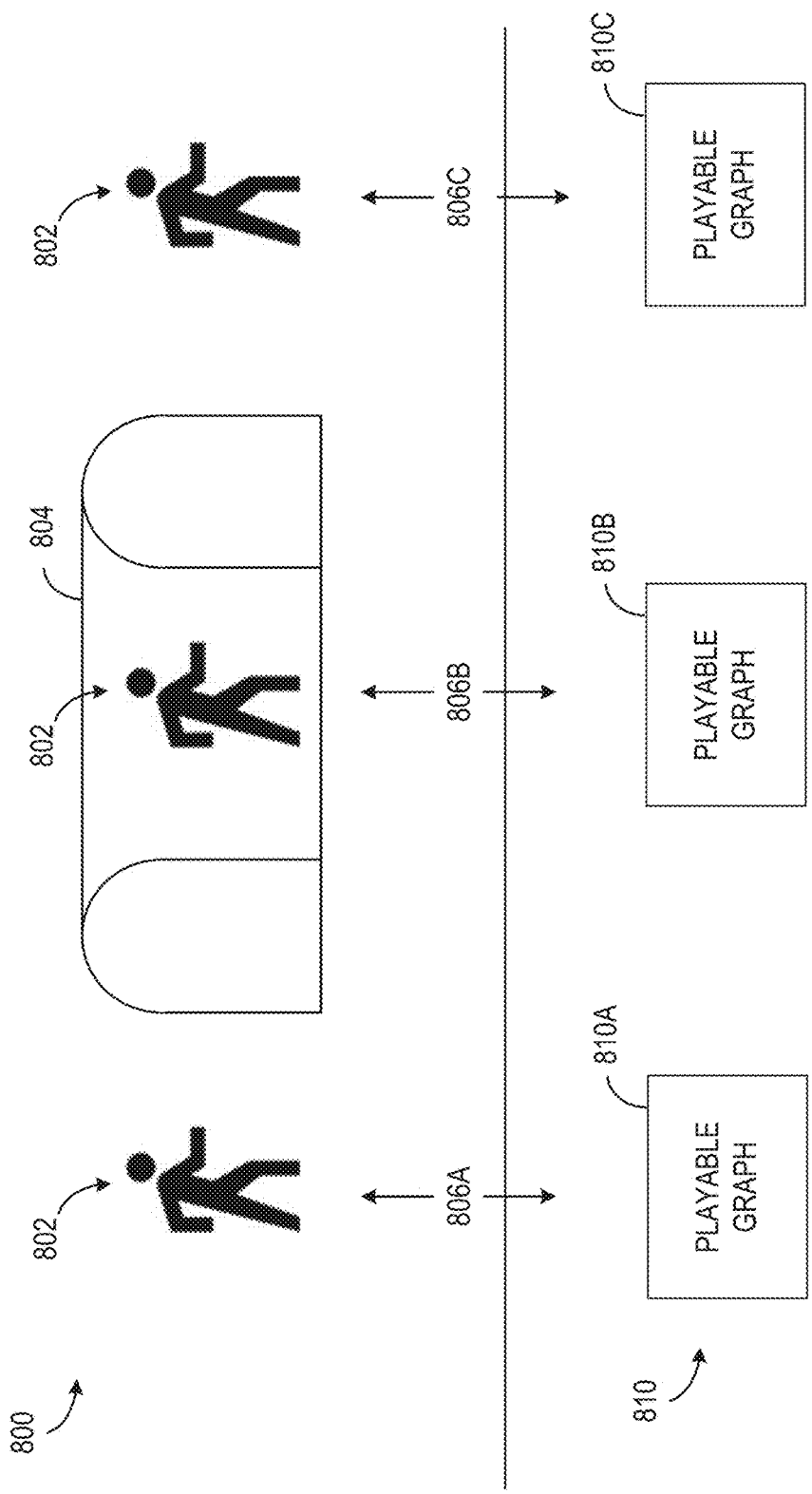

US 10,478,720 B2

DYNAMIC ASSETS FOR CREATING GAME EXPERIENCES

CROSS-REFERENCE TO RELATED APPLICATIONS

This application claims the benefit of priority to U.S. Provisional Patent Application Ser. No. 62/308,785, filed Mar. 15, 2016, which is herein incorporated by reference in its entirety.

TECHNICAL FIELD

The present disclosure relates to the field of digital content creation and, in one example embodiment, to software tools for creating video game experiences.

BACKGROUND

Creating digital content, such as used in modern computer video games, can be a very complicated process involving code writing, set and character creation, animation, and so forth. To reduce some of the complexity in game creation, and to open it up to a larger audience, the game creation artists and technicians benefit from simple visual tools that they use to create game experiences. Most of these artists are not programmers, but they are familiar with graphs (e.g., within a compositor), timelines, and visual programming.

BRIEF DESCRIPTION OF THE DRAWINGS

Various ones of the appended drawings merely illustrate example embodiments of the present disclosure and cannot be considered as limiting its scope.

FIG. 8A illustrates an example computer-generated environment (e.g., a 3D gaming environment) in which an avatar (e.g., an in-game character) walks through a tunnel.

The headings provided herein are merely for convenience and do not necessarily affect the scope or meaning of the terms used. Like numbers in the Figures indicate like components.

DETAILED DESCRIPTION

Figure 1:
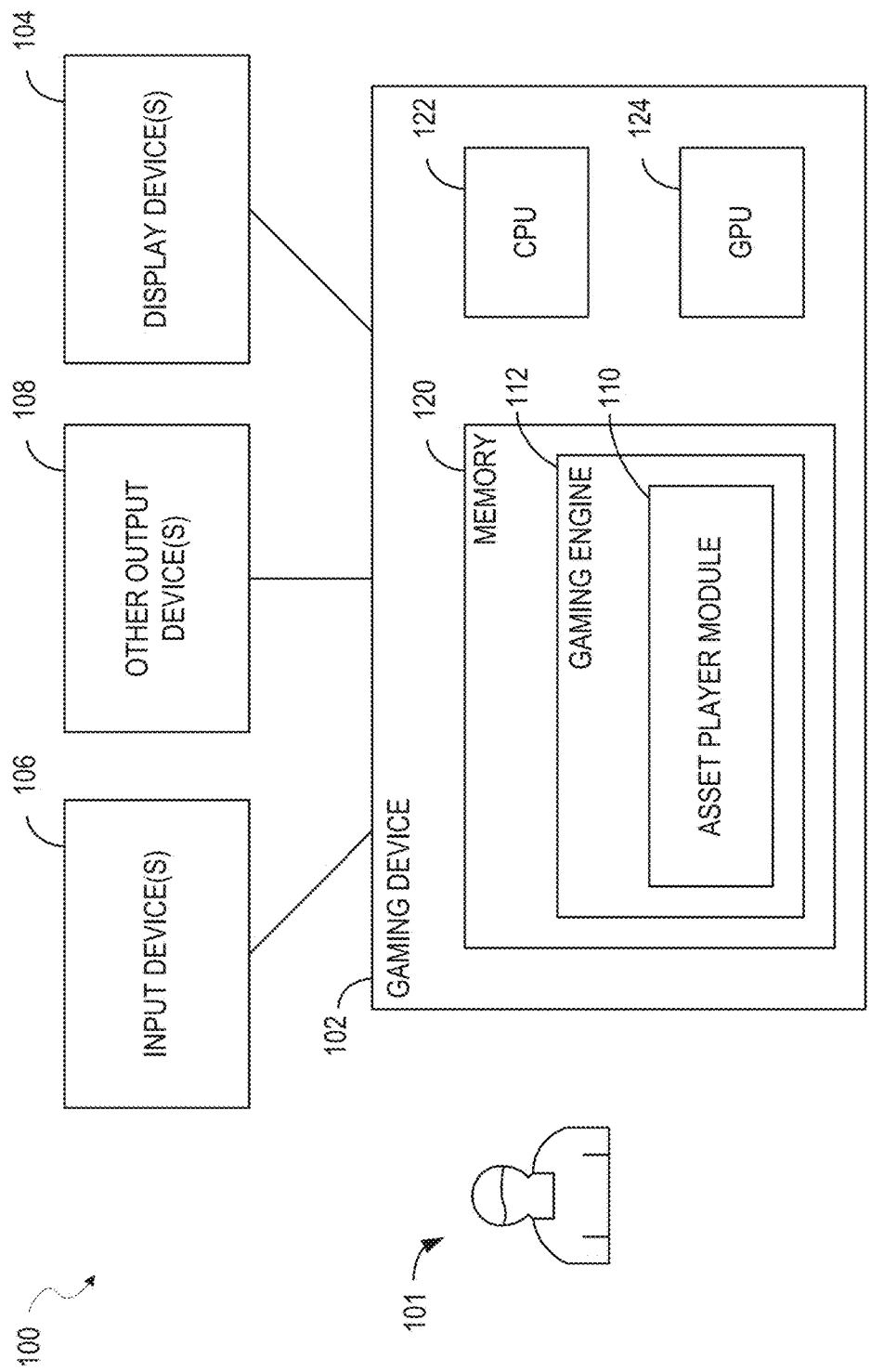
FIG. 1 is a component diagram of an asset player system.

The following description and drawings are illustrative of the disclosure and are not to be construed as limiting the disclosure. Numerous specific details are described to provide a thorough understanding of the present disclosure. However, in certain instances, details well known to those in the art are not described in order to avoid obscuring the description of the present disclosure.

Some known asset pipelines (e.g., for animation, games, and movies) use common processes to create and use multimedia assets. For example, in some known game creation pipelines, a designer (e.g., an audio engineer, audio designer, sound technician, game designer, animation engineer, and the like) may create a file that describes how some aspect of a game (e.g., of a game object or a game event) should behave during play (e.g., at runtime). The aspect may include a sound event, an animation, an animation state machine, a particle effect, and the like. The created file is typically referred to as an asset and may include primarily-static content (e.g., an image, a sound clip, an animation clip), or more dynamic content (e.g., a state machine). Static assets can be modified in a limited way during a game without changing the source material. For example, sound can be modified dynamically using speed, pitch, echo, and blending without changing the chronological playback of the source material. A more dynamic asset such as a state machine may dynamically choose from a fixed set of static assets (e.g., animation clips) whereby the order in which the clips are played is dynamically determined by the game play of the user. However, even for known dynamic assets, they will always play the same way unless the designer builds in a random aspect to the game play response.

As a more specific example, consider one known process involving sound. A sound engineer may create a sound asset for a game event (e.g., a gun shooting) using many sound sources and sound altering processes to perfect the gun sound. The processes may include fading, reverberation, rolloff, and other digital signal processing (DSP) effects known to those in the art. These known processes may be applied to the sound sources in complex ways. The finished asset is then imported into a game as a sound event. At game runtime, the programmer of the game has control over when that game event (e.g., asset) is called and executed (e.g., based on the user's gameplay) and the programmer can dynamically change parameters of the asset in some ways (e.g., usually pitch, volume, and 3D position of the sound based on the current game situation). However, in known systems, the programmer may not be able to change the asset itself and thus may not be able to change the behavior of the sound at runtime (e.g., because those alterations were fixed when the sound engineer created the sound event).

Game engines work within a highly dynamic setting where new events and situations are regularly being created by the game engine 112 and by user activity. For example, a game might spawn a few dozen creatures at any given moment during game play. This dynamic nature of video games is not well served by the traditional asset pipeline and the in-game use of assets in current technology. What is needed is a more dynamic method of creating and handling multimedia assets both before and during game time.

Systems and methods provided herein combine the power of graphs, timelines, state machines and visual programming together in one cohesive system. The systems and methods described herein apply a dynamic graph structure to audio, video, and animation assets to, among other things, define how processes may be applied to input assets (e.g., audio, video, animation) at runtime. Nodes of a dynamic playable graph may include inputs (e.g., static content such as sound files, animation clips, video clips) and processes or references to processes that may be applied to these inputs. The output of the dynamic playable graph (e.g., when executed at runtime) is a playable asset, such as a sound to be presented to the user during gameplay (e.g., a resultant sound played by an audio subsystem, or a resultant animation to be played by an animation subsystem) or, in some cases, a graph structure for a known third-party system supporting static graphs.

The systems and methods described herein provide dynamic asset presentation services that enable presentation of dynamic playable assets (DPAs) at runtime (e.g., during game play). Dynamic playable assets are customizable runtime objects that may be connected together in a graph (e.g., a tree structure) to create complex behaviors. Dynamic playable assets may be used to create complex and flexible data evaluation trees. They may be connected together, after which each dynamic playable asset in the tree can influence each of its children. At runtime, the tree of playable assets may be "played" by an asset player module described herein.

In an example embodiment, an asset player module enables the use of dynamic playable assets for a gaming engine. The asset player module uses dynamic graph mechanics associated with the dynamic playable asset to create and modify video, audio, and animation during runtime. In many of the example embodiments described herein, these systems and methods may be used for controlling game object behavior at runtime in the gaming engine. In other embodiments, these systems and methods may be used in other settings, such as in the creation of motion pictures.

In example embodiments, a dynamic playable asset includes graph configuration data (or just "a graph configuration") for building a dynamic playable graph (or just "graph"). The graph configuration identifies a processing relationship between input assets (e.g., sound clips, video clips, animation clips, script files) and processing steps (e.g., processing modules that act upon input assets to generate output assets). At runtime, the asset player module builds the playable graph from the graph configuration. The playable graph is then used by the asset player module to generate an output playable asset that may be played by conventional players such as audio or video players, or may be used as a part of a larger playable graph. Playable graphs define an order and relation between processes through which inputs flow to generate a new, dynamic output (e.g., at runtime, by the asset player module), and may range from relatively simple to quite complex. During operation, the graph is processed by the asset player module, whose output may be linked to or otherwise associated with a game object.

Dynamic playable assets may include or reference traditional assets such as audio assets (e.g., a WAV file), animation assets (e.g., an FBX file), and video assets (e.g., a QuickTime file), as well as script assets. These assets may be used, for example, as inputs for the dynamic playable asset. Dynamic playable assets may also include asset modifiers (e.g., processes), or references thereto, that are configured to transform the inputs in some way, such as, for example, audio mixers, video, or animation mixers, video effects modules, digital signal processing (DSP) modules, or any process that may be used to modify or transform an asset.

The configuration for the dynamic playable graph is defined as a part of the dynamic playable asset (e.g., as the graph configuration). The initial graph is created from the graph configuration (e.g., instantiated) at runtime but, in some embodiments, may change over time (e.g., during game play). Dynamic playable graphs may have the graph structure or components dynamically changed at runtime, including, for example, moving one or more nodes (e.g., assets or modifiers) around within the graph, adding or removing nodes from the graph, or adding or removing entire branches of the graph (e.g., merging in another playable graph of another playable asset).

Dynamic alteration of playable graphs at runtime enables the asset player module to dynamically change the reaction of a game object (e.g., an object associated with the graph, such as audio associated with motion of a character) during game play, even if the game object has the same user input. For example, the sound of a character walking from an outdoor environment to an indoor environment may be dynamically changed by removing some nodes that provide "outdoor" type sounds and adding some nodes that provide "indoor" type sounds. The graph is changed, thereby changing the sound generated by the graph as the user continues walking the character from outdoor to indoor. Playable graphs can also be implemented in a content-agnostic way such that the same graph structure can be used for either animation, audio or video. For example, the playable graph may be configured to mix two inputs, eliminate a third input, then put both through an attenuator, where each step in the graph may invoke different content-specific processes based on the particular type of media provided.

Traditional graphs in existing technology are static, and any downloadable content (DLC) (e.g., downloaded assets) injected into a game may be required to match with existing graphs. In other words, the conventional DLC cannot change these conventional static graphs because the DLC may be limited to only contain data, and not code (e.g., for greater security).

The systems and methods described herein leverage data (e.g., within the playable assets) to modify graphs, thereby avoiding the reliance on executable code within the DLC. With the dynamic playable graphs and associated systems and methods described herein, DLC may be used to inject new capabilities and behaviors into playable graphs, and at any time, by, for example, modifying the playable asset that creates the graph. The dynamic playable assets described herein are data-driven (e.g., created from data included in the DLC), and the DLC may thus be used to inject new behaviors into game objects by changing the data. The DLC data (e.g., the playable asset) may generate new behaviors by, for example, creating new playable graphs or modifying existing playable graphs for the playable assets. For example, the new behaviors may come from creating new calls to existing functions (e.g., by changing a graph), rather than adding new functions (e.g., adding new code). In other words, these systems and methods allow for introduction of new behaviors via the dynamic changing of graphs without necessarily requiring the injection of new code. For example, using the systems and methods herein, DLC may inject playable assets which are used to create playable graphs that contain artificial intelligence, which may create new behaviors.

FIG. 1 is a component diagram of an asset player system 100. In the example embodiment, the asset player system 100 includes a gaming device 102 in communication with one or more display devices 104, one or more input devices 106 and, in some embodiments, one or more other output devices 108. The asset player system 100 provides a content delivery experience to a user 101. In the example embodiment, the content includes a computer gaming experience provided to the user 101 by a gaming engine 112 through the gaming device 102. The user 101 may be a player playing a computer game using the gaming device 102, or the user 101 may be a developer (e.g., during content creation), and the gaming device 102 may be a computing device used during content creation (e.g., a development workstation).

In some embodiments, the gaming device 202 may be a personal computing device (e.g., a desktop or laptop computer), or a mobile computing device (e.g., a smartphone or tablet), or a wearable computing device (e.g., a head-mounted display (HMD)), or a console gaming device (e.g., Playstation. Wii, Xbox). In other embodiments, the gaming device 202 may be another computing device capable of delivering the content delivery experience as described herein. In some embodiments, the display device 204 may be a computer monitor (e.g., flatscreen display), or a touchscreen (e.g., acting as both a display device 204 and an input device 206), or a display surface (e.g., one for each eye of a wearer of the HMD). In some embodiments, the input devices 206 may include a keyboard, a mouse, a handheld controller, a touchscreen, a microphone, a network adapter, a digital camera, or a motion tracking device. In some embodiments, the other output devices 208 may include audio speakers, or haptic or kinesthetic devices (e.g., to relay forces or vibrations to the user).

In the example embodiment, the gaming device 202 includes a memory 220, one or more central processing units (CPUs) 222, and one or more graphics processing units (GPUs) 224. In some embodiments, the asset player system 200 and the various associated hardware and software components described herein may provide traditional 2-dimensional (2D) content (e.g., on a computer monitor screen), or virtual reality (VR) content or augmented reality (AR) content (e.g., on a head-mounted display), or 3-dimensional (3D) content.

In the example embodiment, the gaming device 202 includes a gaming engine 212 which, when executed by the CPU 222 and/or GPU 224, provides a gaming environment to the user (e.g., a computer game). The gaming engine 212 includes an asset player module 210 that enables various aspects of dynamic playable assets as described herein. The asset player module 210 may be implemented within, or communicate with, a larger more generic software application such as the gaming engine 212 (e.g., as shown in FIG. 1), or may operate outside of the gaming engine 212 (e.g., autonomously, or external to another requesting application).

The asset player module 210 and the gaming engine 212 include computer-executable instructions residing in the memory 220 that are executed by the CPU 222 and/or by the GPU 224 during operation. The gaming engine 212 communicates with the display device 204 and also with the input devices 206 and other output devices 208. The asset player module 210 may be integrated directly within the gaming engine 212, or may be implemented as an external piece of software (e.g., a plugin).

During operation, and in the example embodiment, the asset player module 210 provides asset presentation services to the gaming engine 212, allowing dynamic playable assets to be presented to the user (e.g., as audio output, video output, animation output). The asset player module 110 operates in conjunction with the gaming engine 112 to generate audio, video, or animation output that may be played by a conventional media player and presented to the user 101 (e.g., during game play). Further, the asset player module 110 may dynamically change playable graphs associated with the dynamic playable assets (e.g., based on the context and actions taken by the user 101, or by the gaming engine 112, during game play).

Figure 2:
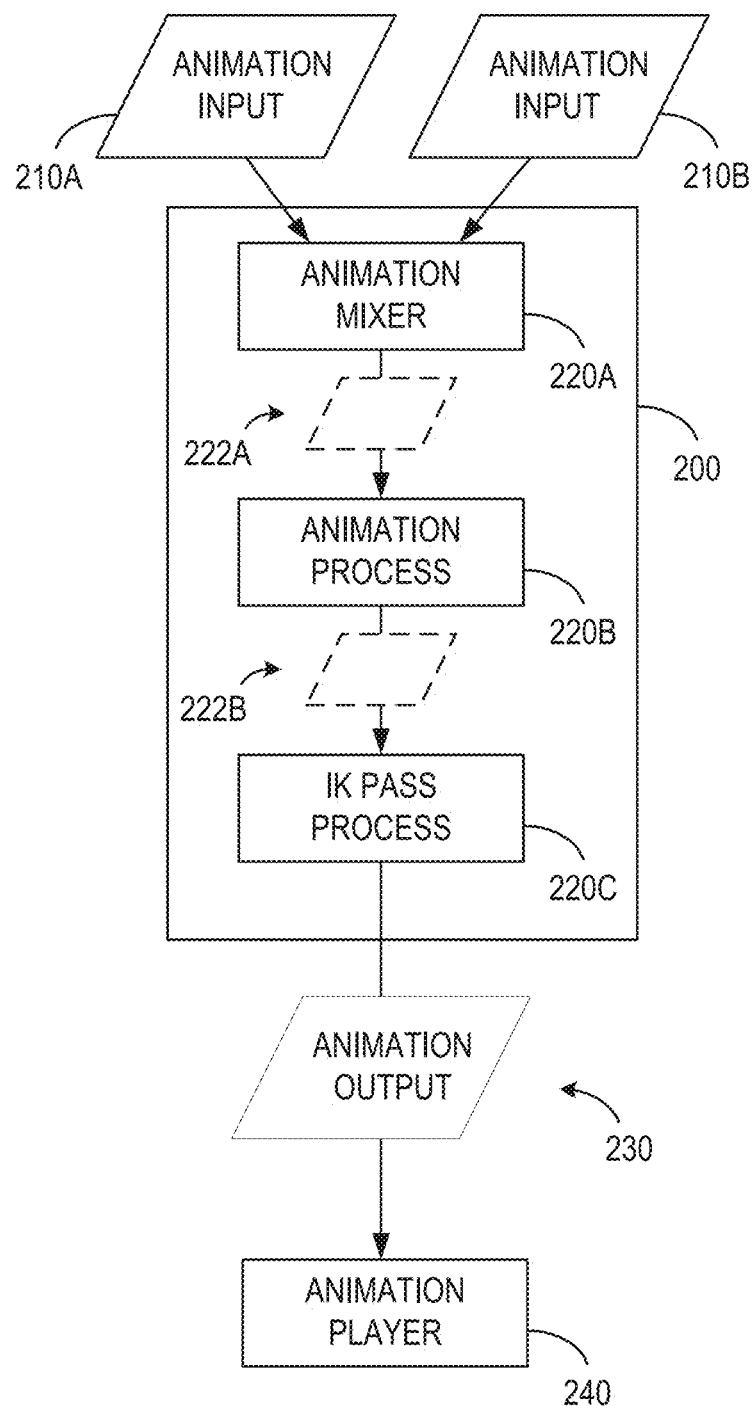
FIG. 2 illustrates an example animation playable graph for generating an output animation playable from one or more input animation playables (or just "inputs").
Figure 3:
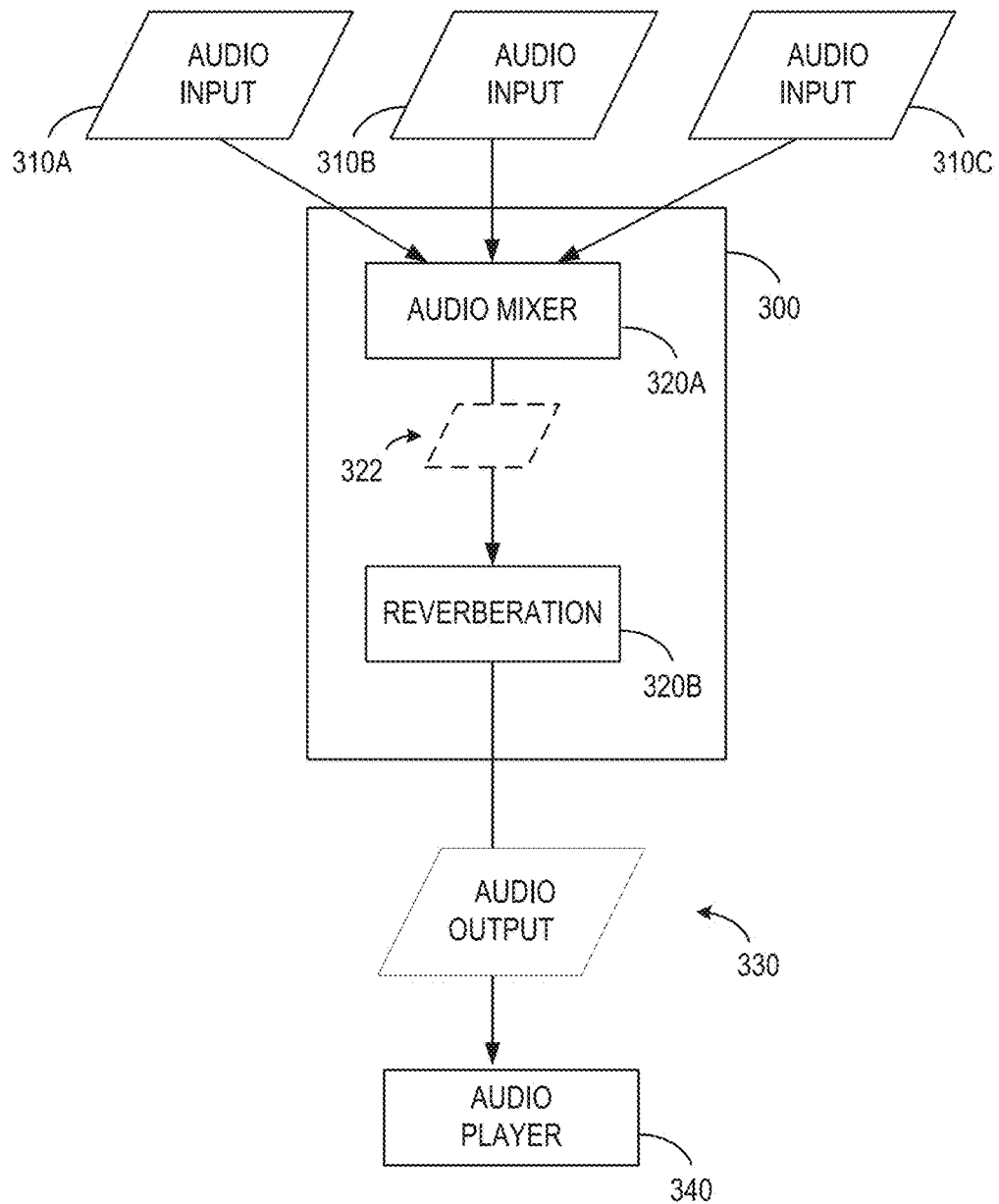
FIG. 3 illustrates an example audio playable graph for generating an output audio playable.
Figure 4:
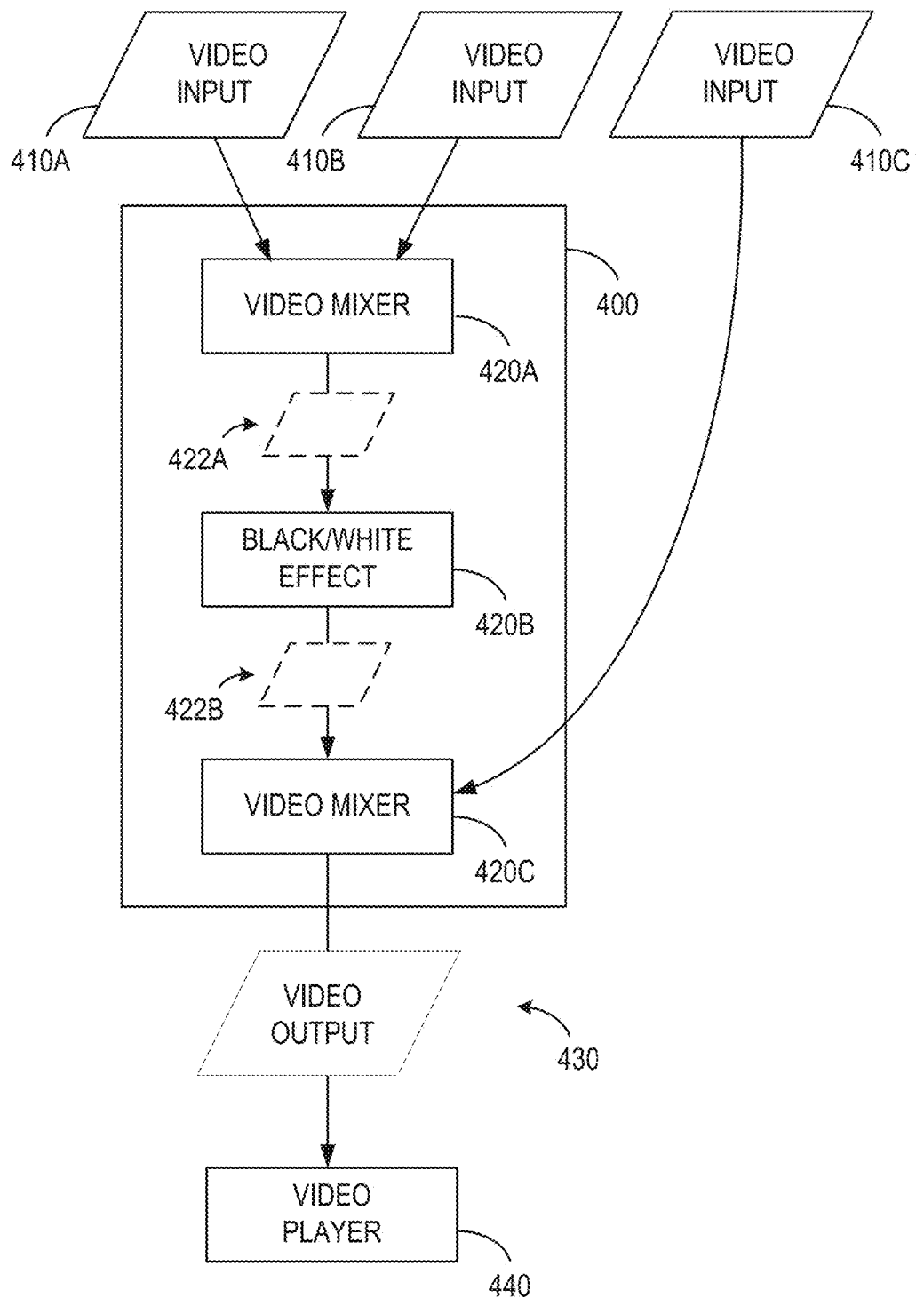
FIG. 4 illustrates an example video playable graph for generating an output video playable.

FIG. 2, FIG. 3, and FIG. 4 are diagrams of example playable graphs 200, 300, 400. Playable graphs, such as playable graphs 200, 300, 400, are directed graphs defining a data flow represented by a set of nodes and their corresponding edges. The nodes of the graphs 200, 300, 400 are 'modifier' nodes, each referencing a process through which an input may be used to generate an an output. The nodes of the graphs 200, 300, 400 are represented in FIGS. 2-4 as rectangular boxes.

Also depicted within the graphs 200, 300, 400, though not necessarily a part of the graphs 200, 300, 400, are intermediate playables 222, 322, 422 (illustrated as broken lined trapezoids between modifier nodes). Each intermediate playable 222, 322, 422 represents the output of the previous modifier node or nodes, and may be used as an input to another modifier node (e.g., another process). In the example embodiment, each process, or modifier node, in the graphs 200, 300, 400 accepts one or more playable inputs and generates one or more playables as an output. In other words, the output playable is a modification of the input(s) based on the operations performed by the process. The graphs 200, 300, 400 thus represents a set of directional relationships between linked modifiers (e.g., the directed edges of the graphs 200, 300, 400) that act upon data (e.g., playables), and in a particular, ordered relationship.

In the example embodiment, the playable graphs 200, 300, 400, once created, are executed by the asset player module 110, thereby generating an output playable formatted to conform with one or more standard media systems, which may include one or more media players (e.g., FMOD™). In some embodiments, there are three example types of known media systems (e.g., conventional media players) that could be used with the systems described herein: audio systems, video systems, and animation systems. Media systems process specific types of data, and in various known formats. For example, video systems may process video data in Audio Video Interleaved (AVI) format, or Moving Picture Experts Group (MPEG) format, and so forth. Each type of media system is configured to process associated types of data.

FIG. 2 illustrates an example animation playable graph 200 for generating an animation output 230 from one or more animation inputs (or just "inputs") 210A, 210B (collectively, "inputs 210"). In some embodiments, the animation inputs 210 may be simple animation data, such as animation clips or files. In other embodiments, the animation inputs 230 may be dynamic playable assets. In the example embodiment, the playable graph 200 includes multiple modifier nodes: an animation mixer 220A; an animation process 220B; and an IK pass process 220C (collectively, "modifier nodes 220"). In the example embodiment, the graph 200 is a directed graph, and the nodes of the graph are linked with directed edges representing a flow relationship between the nodes 220. Also illustrated in FIG. 2, though not necessarily a part of the graph 200, are intermediate playables 222A, 222B. Each intermediate playable 222, as illustrated in FIG. 2 in broken line, represents the output of the preceding modifier node 220.

Each modifier node 220 references one or more processes (e.g., executables) that, during operation, receive an input (e.g., inputs 210, or the preceding intermediate playable 222), performs one or more animation effect processes on the inputs (e.g., by the asset player module 110) to generate an output (e.g., the animation playable 230, or one of the intermediate playables 222). In other words, the graph 200 defines the relationship between processes for executing multiple animation processing steps on the inputs 210 to generate the output animation 230. In some embodiments, the output animation 230 may be a simple animation output, such as an animation clip or file that may be played by a conventional media player. In other embodiments, the output animation 230 may be a dynamic playable asset. For purposes of convenience, the modifier nodes 220 may also be referred to herein as processes 220, referring to the animation processes associated with the modifier node.

During operation, the graph 200 is read and processed by the asset player module 110. More specifically, the asset player module 110 directs the inputs 210 through the processes 220 (e.g., the modifier nodes) defined by the graph 200, executing each process 220 with the input flow as defined by the graph 200. In the example shown in FIG. 2, the asset player module 110 provides the input animation playables 210A, 210B to the animation mixer 220A and executes the animation mixer 220A, resulting in the intermediate playable 222A as output. The asset player module 110 then provides the intermediate playable 222A as input to the animation process 220B and executes the animation process 220B, resulting in the intermediate playable 222B as output. The asset player module 110 then provides the intermediate playable 222B as input to the IK pass process 220C and executes the animation process 220C, resulting in the animation output 230 as output. The asset player module 110 then passes the animation output 230 to the animation player 240 for presentation (e.g., display) to a user (e.g., the user 101). In other embodiments, the animation output 230 may be a dynamic playable asset, and the animation output 230 may be provided as an input in a larger graph.

Similarly, FIG. 3 and FIG. 4 illustrate an example audio playable graph 300 and video playable graph 400 for generating an audio output 330 and a video output 430, respectively. More specifically, in the example shown in FIG. 3, the audio playable graph 300 includes audio inputs (or just "inputs") 310A, 310B, 310C (collectively, inputs 310), and a series of processes (or "modifier nodes"): an audio mixer 320A; and a reverberation process 320B (collectively, modifier nodes 320). The modifier nodes 320 represent audio effect processes through which the inputs 310 will be processed by the asset player module 110 to generate the audio output 330 (e.g., for presentation to the user 101 by an audio player 340). The graph 300, the processes 320, and an intermediate playable 322 may be similar to the graph 200, the processes 220, and the intermediate playables 222 shown in FIG. 2, respectively. Modifier nodes 320 for the graph 300 include an audio mixer 330A, and reverberation 330B.

In the example shown in FIG. 4, the video playable graph 400 includes video inputs (or just "inputs") 410A, 410B, 410C (collectively, inputs 410), and a series of processes (or "modifier nodes"): video mixer 420A; a black/white effect process 420B; and a video mixer 420C (collectively, modifier nodes 420). The modifier nodes 420 represent video effect processes through which the inputs 410 will be processed by the asset player module 110 to generate the video output 430 (e.g., for presentation to the user 101 by a video player 440). The graph 400, the processes 420, and an intermediate playable 422 may be similar to the graph 200, the processes 220, and the intermediate playables 222 shown in FIG. 2, respectively.

Referring now to FIGS. 2-4, the graphs 200, 300, 400 represent a structured set of processes applied to media data (e.g., audio, video, animation, such as the inputs 210, 310, 410) or script data. In the example embodiment, each process 220, 320, 420 is implemented in software executed by the gaming device 102 (e.g., by the asset player module 110). In some embodiments, one or more of the processes 220, 320, 420 may be separate software modules (e.g., separate executables). In some embodiments, one or more of the processes 220, 320, 420 may be software modules integrated into the gaming engine 112, or into the asset player module 110 (e.g., as a library of processes). For example, the video mixer 420A is executed by the asset player module 110, which accepts two or more video inputs (e.g., data files or streams such as the video input 410A and the video input 410B) to mix the inputs using a given set of parameters (e.g., as described within the mixers), and with the output being a video output (e.g., the intermediate playable 422A, a data file or stream).

Further, the playable graphs 200, 300, 400 may include many different processes 220, 320, 420 (e.g., different processes that perform various functions on the input(s)). In the example embodiment, the playable graphs 200, 300, 400 may be executed like a pipeline, where the output (e.g., playables 230, 330, 430) is modified or updated on a frame by frame basis (e.g., for video or animation). For example, the dynamic playable graph 200 may output one animation pose at a time (e.g., per frame), and the player processing the graph may perform recurring execution of the graph 200 to extract the next pose for each frame, thereby building the animation output 230. As described in further detail below, the graphs 200, 300, 400 may change during execution and, as such, the processing for each frame is controlled, at least in part, by the structure of the graphs 200, 300, 400 at the time.

While the example embodiments shown in FIGS. 2-4 show process 220, 320, 420 nodes within the graphs 200, 300, 400, it should be understood that the inputs 210, 310, 410 may also be a part of the graphs 200, 300, 400.

FIG. 5A-12 illustrate example uses of graphs, such as the graphs 200, 300, 400, integrated and used as a part of dynamic playable assets. The term "dynamic playable asset", as used herein, refers to data containers that include a set of instructions (e.g., graph configuration data) for building (e.g., at runtime) one or more playable graphs (e.g., the playable graphs 200, 300, 400), where the playable graphs may then be used for generating media output (e.g., outputs 230, 330, 430) as described herein. That same term may also be used to refer to that same data structure, as it is used and evolves during execution. The dynamic nature of a dynamic playable asset refers to its changing nature during execution, as described herein. Dynamic playable assets may accept one or more inputs, and may be used (e.g., by the asset player module 110) to produce media outputs (e.g., media that may be presented to the user 101 via standard media systems, or playables that may be used to generate such media). A playable graph, built from graph configuration data provided by a dynamic playable asset, represents operations performed by the asset player module 110 (e.g., based on the inputs, during gameplay) to produce the media output presented to the user via standard media players.

Some dynamic playable assets may include multiple inputs and multiple outputs, and may include a mix of media types. Some dynamic playable assets may include a function or object that may be called to create the instance of the dynamic playable asset. The function or object may use the data from within the dynamic playable asset. During operation (e.g., during game play), a call to the function or object is initiated (e.g., via scripting, or via a game component) to instantiate the dynamic playable asset. Once instantiated, the asset player module 110 traverses the playable asset(s) in a tree. Each time a playable asset is encountered, the asset player module 110 calls a preparation method (e.g., "PrepareFrame" method) which is configured to prepare the asset for its next evaluation. During the preparation phase, the asset may modify its children (e.g., adding or deleting inputs, spawning new children branches in the playable asset tree). As such, the graph of playable assets is not a static structure, but rather can adapt and change over time.

For example, consider a dynamic playable asset called "CameraShot." CameraShot is configured to change camera views and add visual effects (e.g., during game play). CameraShot includes graph configuration data defining a playable graph that, when the CameraShot graph is executed, causes the user's view to switch to a specific camera in a 3D scene, apply a noise curve on the camera to simulate shaking, and apply lens effects on the camera (e.g., depth of field). The CameraShot dynamic playable asset includes data defining the camera switch (e.g., the process to use for the camera view, configuration parameters for that process), as well as data defining the animation curve applied to the camera position (e.g., the process to use to implement the shaking), and data to define the image effects applied to the shot (e.g., post-processing processes and parameters). The dynamic playable asset also includes a function (e.g., an object) that may be used to build (e.g., creates an instance of) the graph of the dynamic playable asset at runtime. As such, the CameraShot playable asset is an example of a simple playable asset used to create a playable for presentation to a user.

Playable assets can include or otherwise be combined together to form complex graphs (e.g., via large playable graphs). Several types of playable assets are described herein, including complex playable assets that produce larger playable graphs. Some examples include sequence playable assets (SPAs), state machine playable assets (SMPAs), and custom playable assets (CPAs).

Figure 5A:
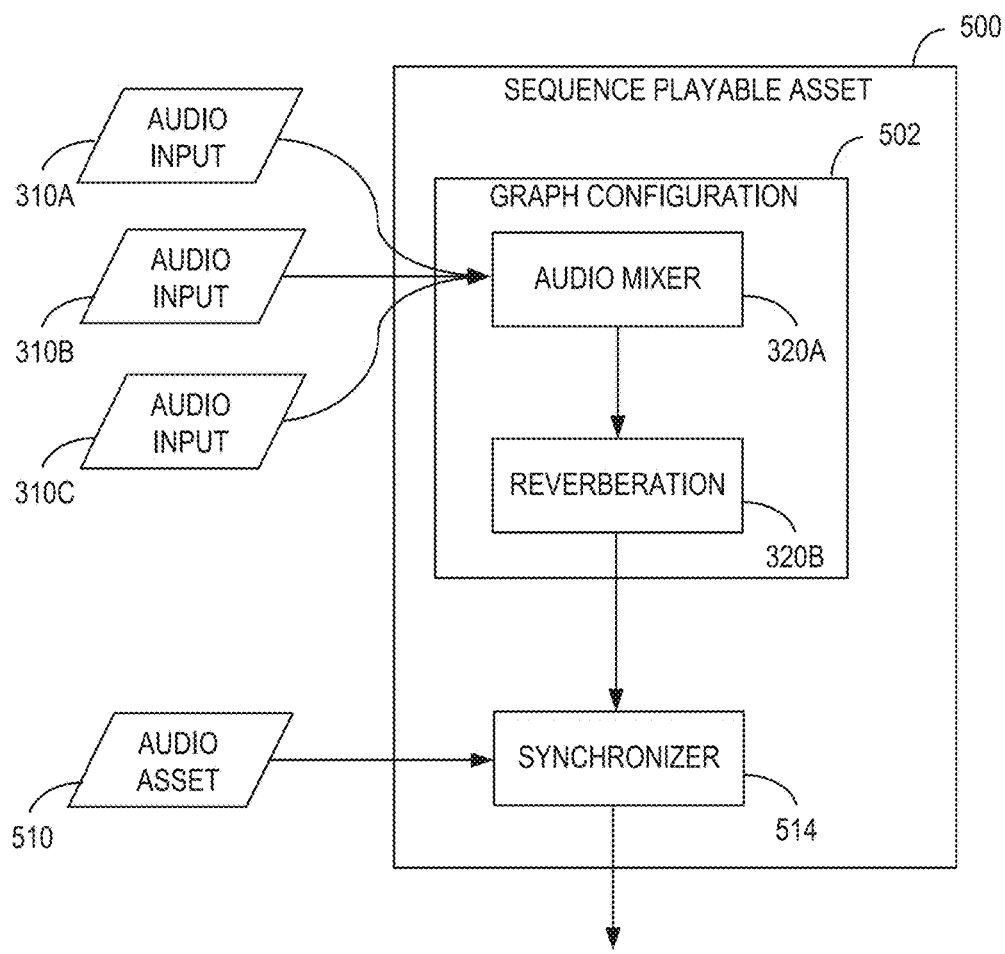
FIGS. 5A and 5C illustrate example dynamic playable assets and, more specifically, sequence playable assets, that include playable graph configurations for building graphs such as the playable graphs shown in FIGS. 2-4.
Figure 5B:
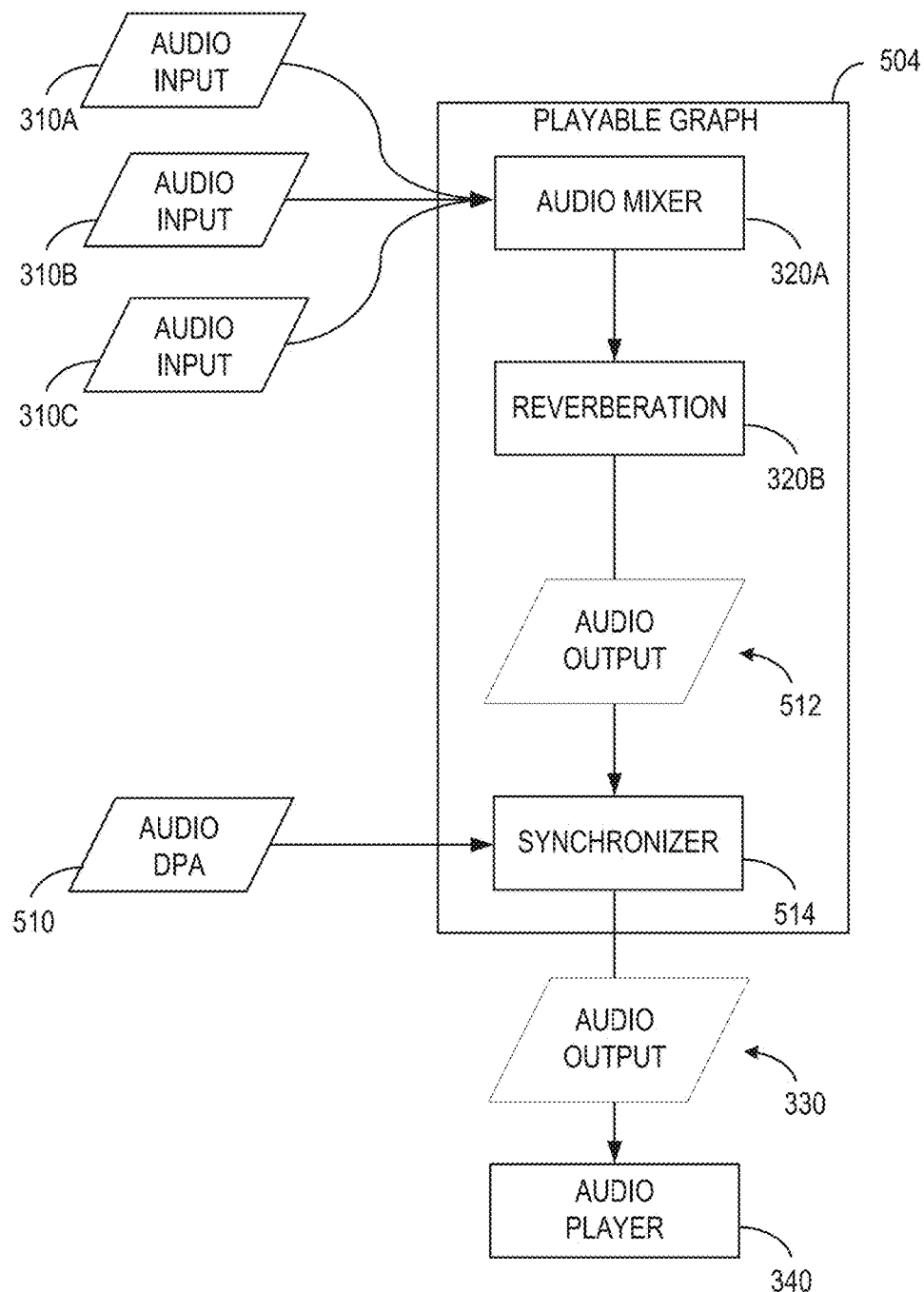
FIGS. 5B and 5D illustrate example playable graphs for the sequence playable assets shown in FIGS. 5A and 5C, respectively.
Figure 5C:
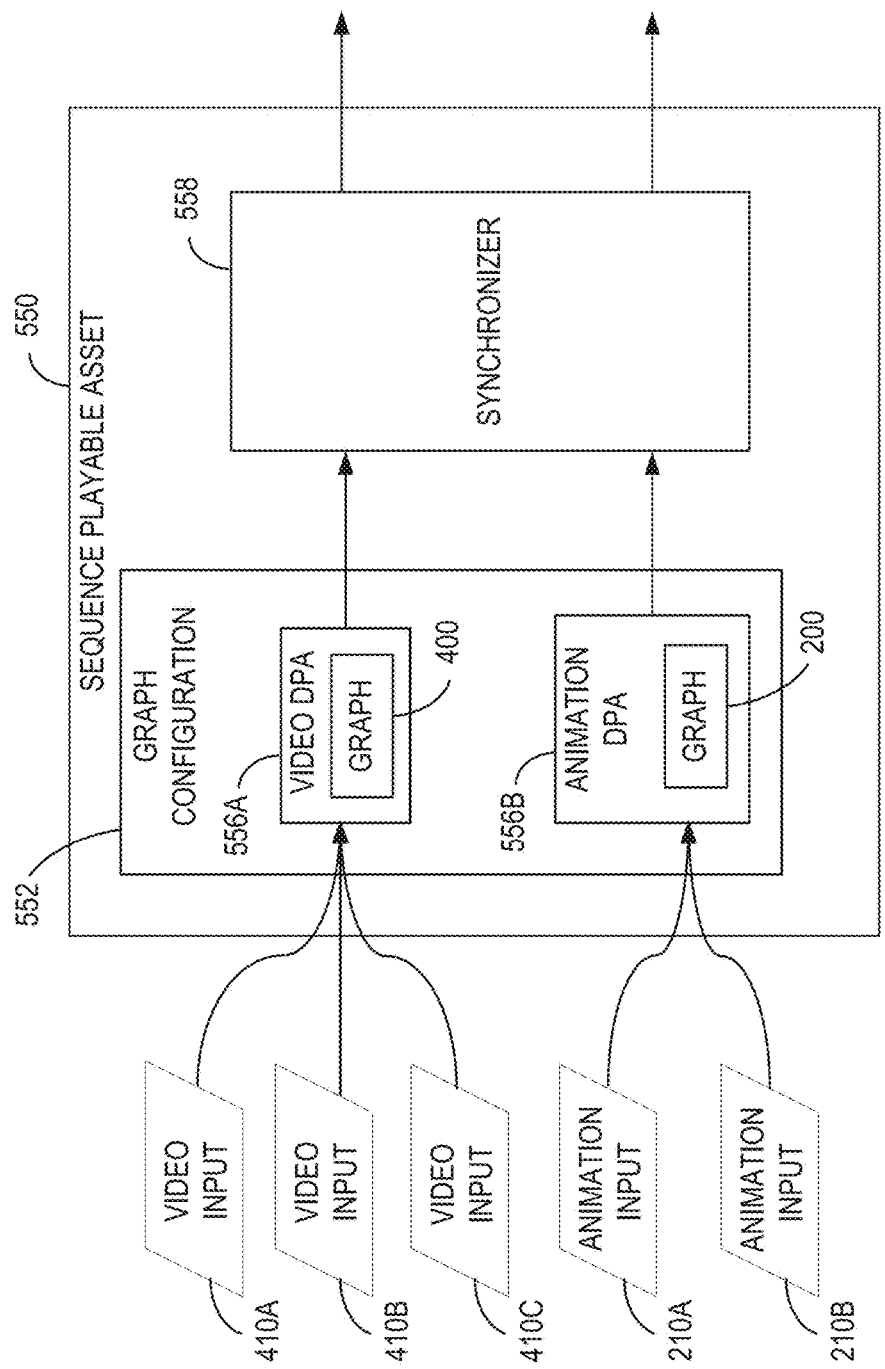

FIGS. 5A and 5C illustrate example dynamic playable assets and, more specifically, sequence playable assets 500, 550, that include playable graph configurations 502, 552 for building graphs such as the playable graphs 200, 300, 400.

Figure 5D:
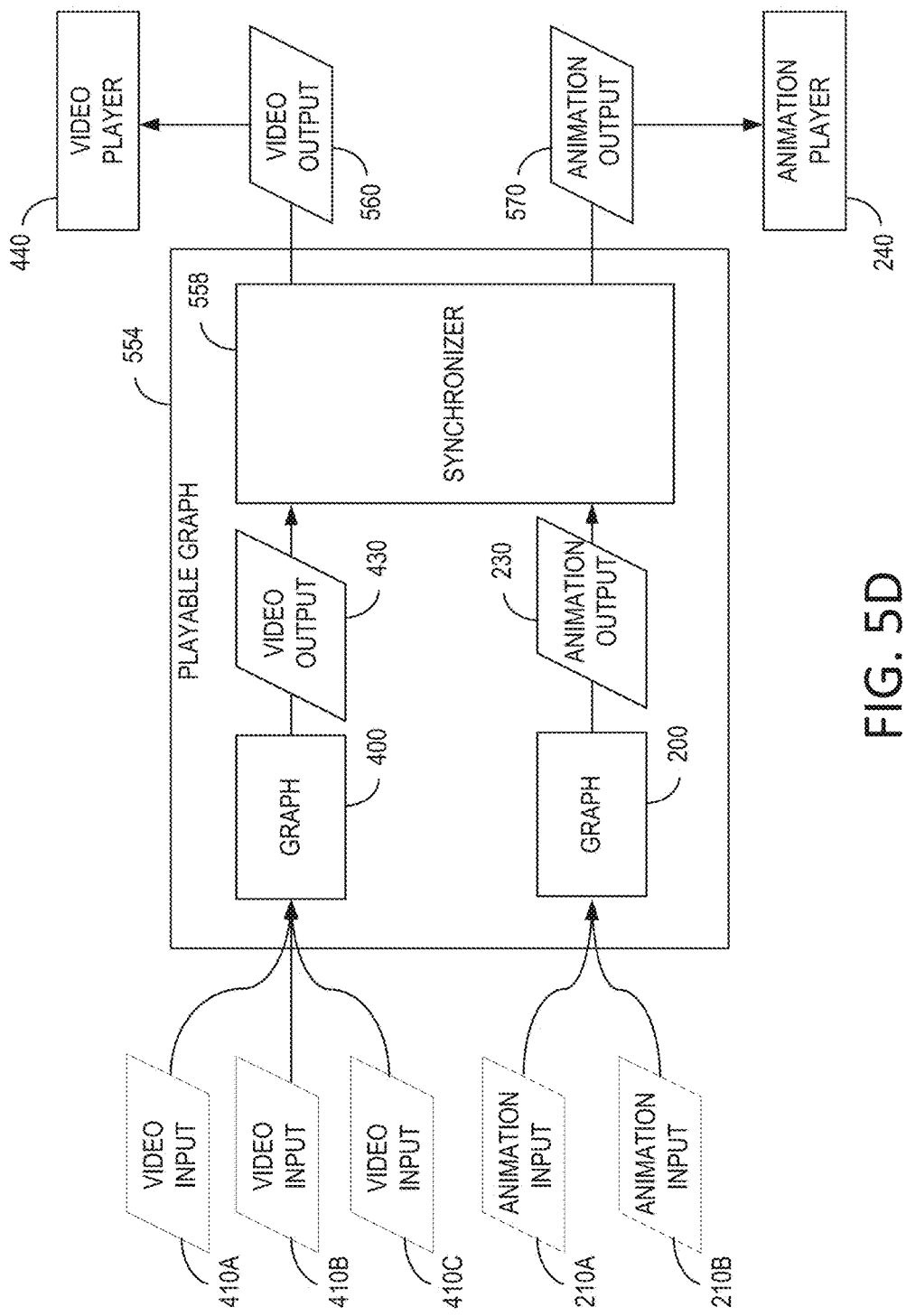

Sequence playable assets 500, 550 are one type of dynamic playable asset described herein. Sequence playable assets 500, 550 are configured to take multiple inputs of the same or different media types and synchronize them in time. FIGS. 5B and 5D illustrate example graph configurations 502, 552 generated from the sequence playable assets 500, 550, respectively. In the example shown in FIG. 5A, the sequence playable asset 500 is configured to synchronize multiple inputs with the same data type (e.g., audio data from audio playable asset 510 and an intermediary audio playable 330 output from processing the graph 300). In the example shown in FIG. 5C, the sequence playable asset 550 includes its own graph configuration 552 that identifies two "nested" dynamic playable assets, a video DPA 556A and an animation DPA 556B, each of which also define their own graph configurations 400, 200, respectively. The example sequence playable asset 550 is configured to synchronize different data types (e.g., animation and video) in time such that the outputs of each type (e.g., video output 560 and animation output 570) will be temporally synchronized together. The configuration details of the synchronization are included in the instructions within the sequence playable assets 500, 550.

FIGS. 5B and 5D illustrate example playable graphs for the sequence playable assets shown in FIGS. 5A and 5C, respectively. In the example embodiment, the sequence playable assets 500, 550 include graph configurations 502, 552 used to build playable graphs 504, 554, respectively. In other words, the graph configuration 502 is used to construct the playable graph 504, and the graph configurations 504, 200, and 400 are used to construct the playable graph 554. In the example embodiment, the asset player module 110 builds and executes the playable graphs 504, 554 at runtime to generate outputs for presentation to the user 101. The graphs 504, 554 created from the sequence playable assets 500, 550, when executed by the asset player module 110, are configured to temporally synchronize two or more playables (e.g., put two or more playables into a synchronized sequence, or more than one synchronized sequence).

Referring now to FIGS. 5A and 5B, in the example embodiment, the asset player module 110 uses the sequence playable asset 500 to generate an output audio playable 330 for presentation to the user 101. More specifically, the graph configuration 502 is used to generate the playable graph 504 which, when executed by the asset player module 110, synchronizes the audio playable assets 310A and 310B and 310C with the audio playable asset 510, resulting in the output audio playable 330.

Playable assets such as the sequence playable asset 500 can be created during game development. For example, during game development, a sound engineer may create a sound for a game event, such as a gun shooting. The sound engineer may create the playable asset 500 with multiple processes 320 and sound sources arranged in the graph 502 by the engineer (e.g., fading, reverberation 320B, rolloff, other DSP effects, to alter the sound of the gunshot to achieve the desired sound effect). Another audio playable asset 510 is also created by the engineer. The engineer adds the synchronizer 514 to the sequence playable asset 500, allowing the sequence playable graph 504 to synchronize the audio playable asset 510 with the output of the graph 502 (e.g., with the intermediary audio output 512). The playable asset 500 is then used during game play (e.g., imported into the game and performed by the asset player module 110).

In the example embodiment, the software programmer that creates the game has control over when that game event is called and executed during a game (e.g., when the sequence playable asset 500 is invoked, based on the user's gameplay). During operation, the game executes the sequence playable asset 500, which is used to dynamically generate the playable graph 504. The asset player module 110 reads and executes the graph 504 and signals the processes 320A, 320B, and 514 to process the inputs 310A, 310B, 310C, and 510 to generate the audio output 330. The audio output 330 is then passed to a game object for presentation to the listener (e.g., the player of the game) via a standard audio player or device (e.g., the audio player 340).

Referring now to FIGS. 5C and 5D, and as mentioned above, the example sequence playable asset 550 acts as a synchronizer between multiple nested playable assets, the video DPA 556A and the animation DPA 556B. The video DPA 556A and the animation DPA 556B are "nested" dynamic playable assets (e.g., playable assets within or referenced by another playable asset). Sequence playable assets, such as the sequence playable assets 500, 550, may allow animation data, audio data, and video data, or any combination thereof, to be synchronized in time.

During operation, the asset player module 110 executes the sequence playable asset 550. This execution includes executing the video DPA 556A and the animation DPA 556B (collectively, the nested DPAs 556) to independently generate the output video playable 430 and the output animation playable 230, respectively. More specifically, each of the nested DPAs 556 includes associated graphs 400, 200, respectively, that are constructed and executed to generate the playables 430, 230. On a frame-by-frame basis, the asset player module 110 synchronizes the output animation playable 230 with the output video playable 430 using a synchronizer 558 provided or otherwise referenced by the sequence playable asset 550. The synchronizer 558, in this example embodiment, is configured to generate separate but synchronized video playable 560 and animation playable 570. In some embodiments, the synchronizer 558 may be executed before the playable assets 552, 554, or may be incorporated into one or more of the graphs 200, 400. The resultant synchronized playables 560, 570 are sent to the video player 440 and animation player 240, respectively. The video output 560 (e.g., a video clip, or a video DPA) can then be passed to a game object (not shown), and the animation output 570 (e.g., an animation clip, or an animation DPA) can then be passed to a game object (not shown), for presentation to the viewer (e.g., the player of the game). The video player 562 and animation player 572 ignores all other inputs other than the video playables 553 and animation playables 554, respectively. While only five inputs 553, 554 are shown in the example embodiment, it should be understood that many inputs may be used, and SPAs 500, 550 may be nested within other SPAs to generate more complex effects.

FIG. 5D illustrates the composite playable graph 554 generated and executed at runtime for the sequence playable asset 550 shown in FIG. 5C. During operation, in the example embodiment shown in FIG. 5B and FIG. 5C, the game engine executes the sequence playable asset 550, via the asset player module 110. The asset player module 110 instantiates the playable graph 554, including the sequence playable graphs 200, 400 from the nested DPAs 556 On a frame-by-frame basis, the asset player module 110 executes the playable graph 554, generating the video output 430 and animation output 230 separately. These outputs 230, 430 are then processed through the synchronizer 558 in order to produce a synchronized video output 560 and animation output 570. The video DPA 556A and the animation DPA 556B are temporally synchronized because of the synchronizer 558 in the playable graph 554. In some embodiments, the synchronization may happen before the playable graphs 200, 400, or may be incorporated into the graphs 200, 400.

Figure 11:
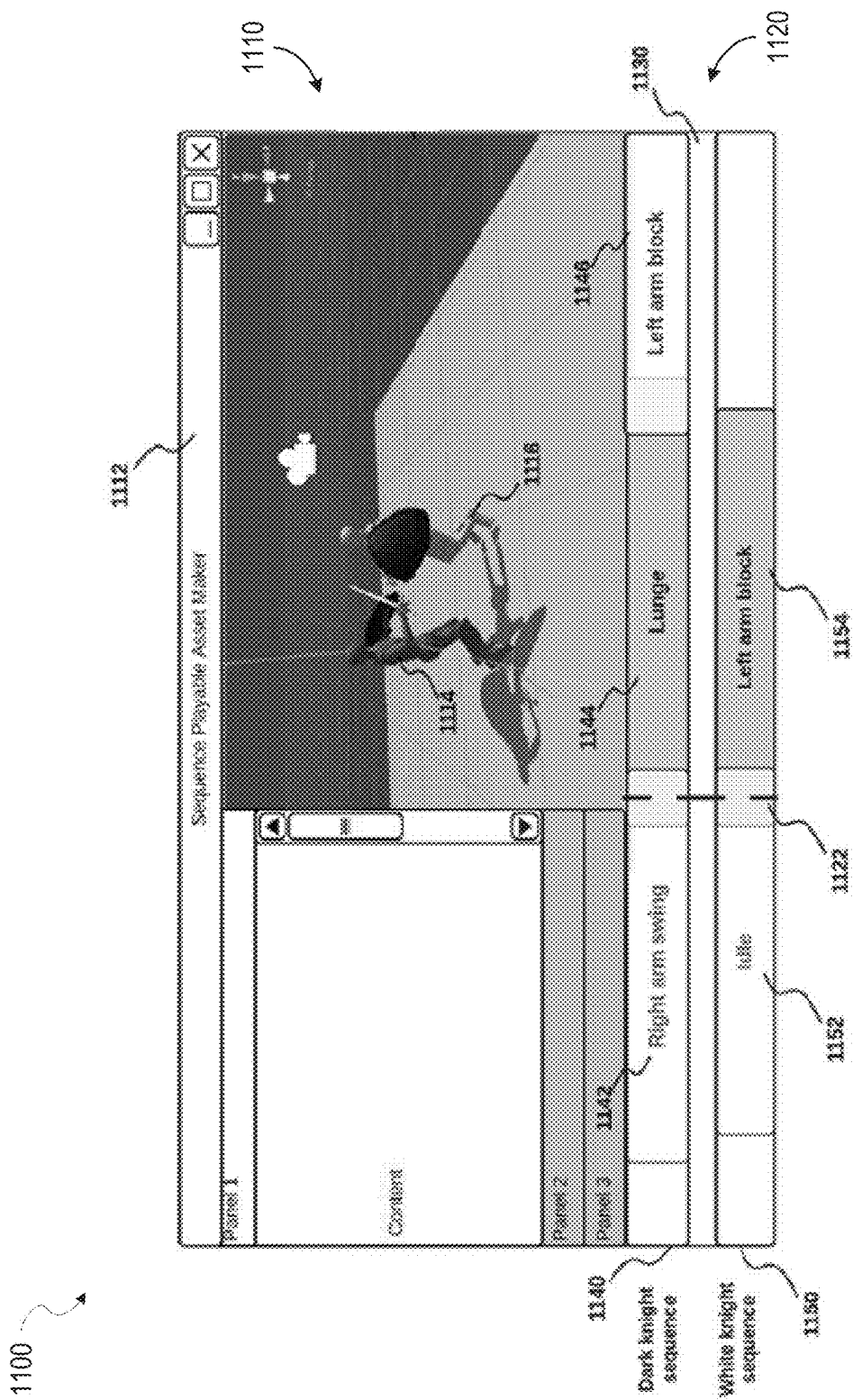
FIG. 11 is a user interface (UI) for creating sequence playable assets such as the sequence playable asset shown in FIG. 9.

Sequence playable assets 500, 550, may be created, modified, and viewed via a user interface (e.g., further described below) during development. The contents of the sequence playable assets 500, 550 include the information for building the playable graphs (e.g., the graph configuration 502) that represent the particular arrangement of the elements in time, along with their associated parameters. FIG. 11, below, describes a user interface 1100 that may be used to create or configure playable assets such as the sequence playable assets 500, 550.

Figure 6A:
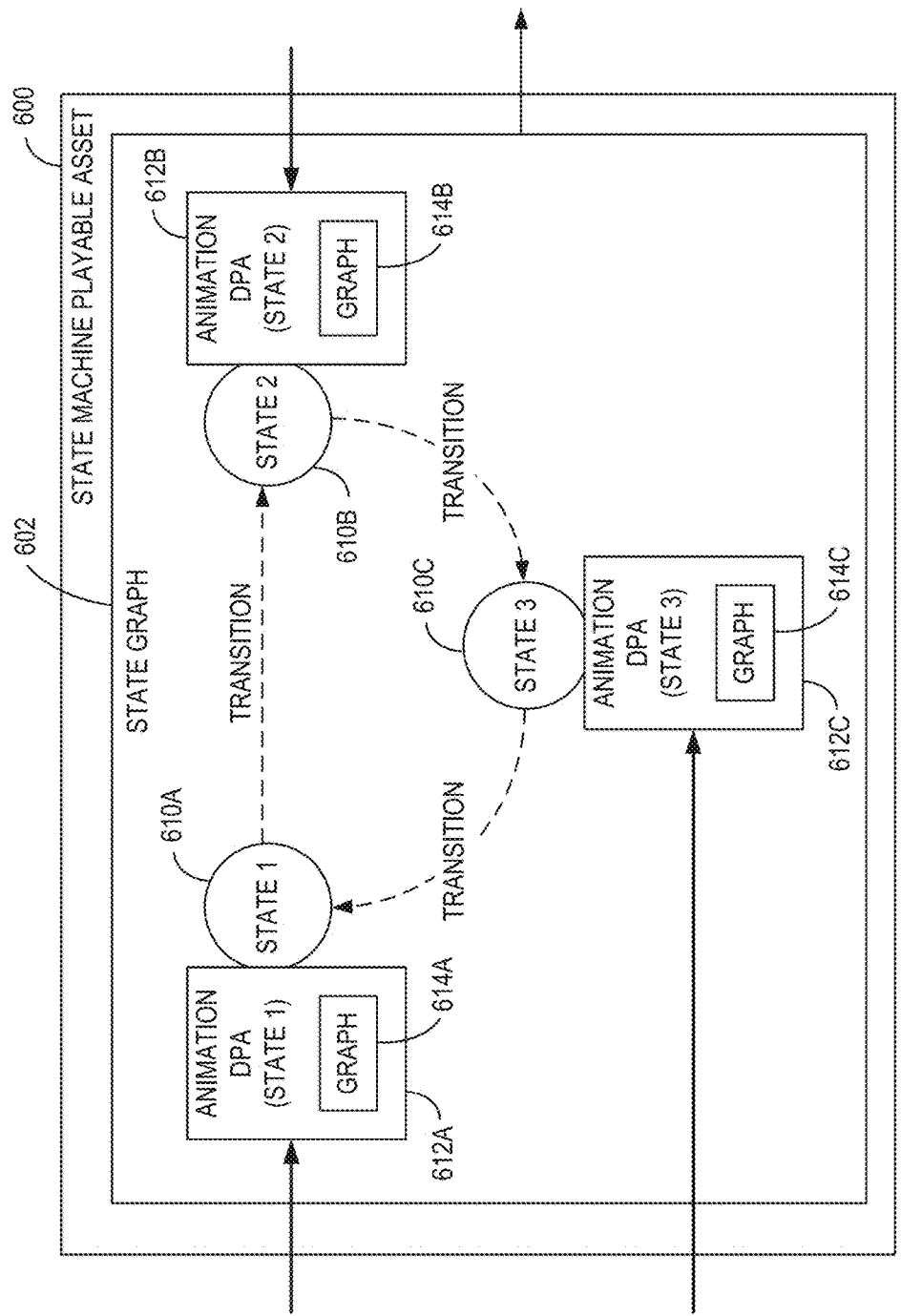
FIG. 6A is an example state machine playable asset (SMPA)
Figure 6B:
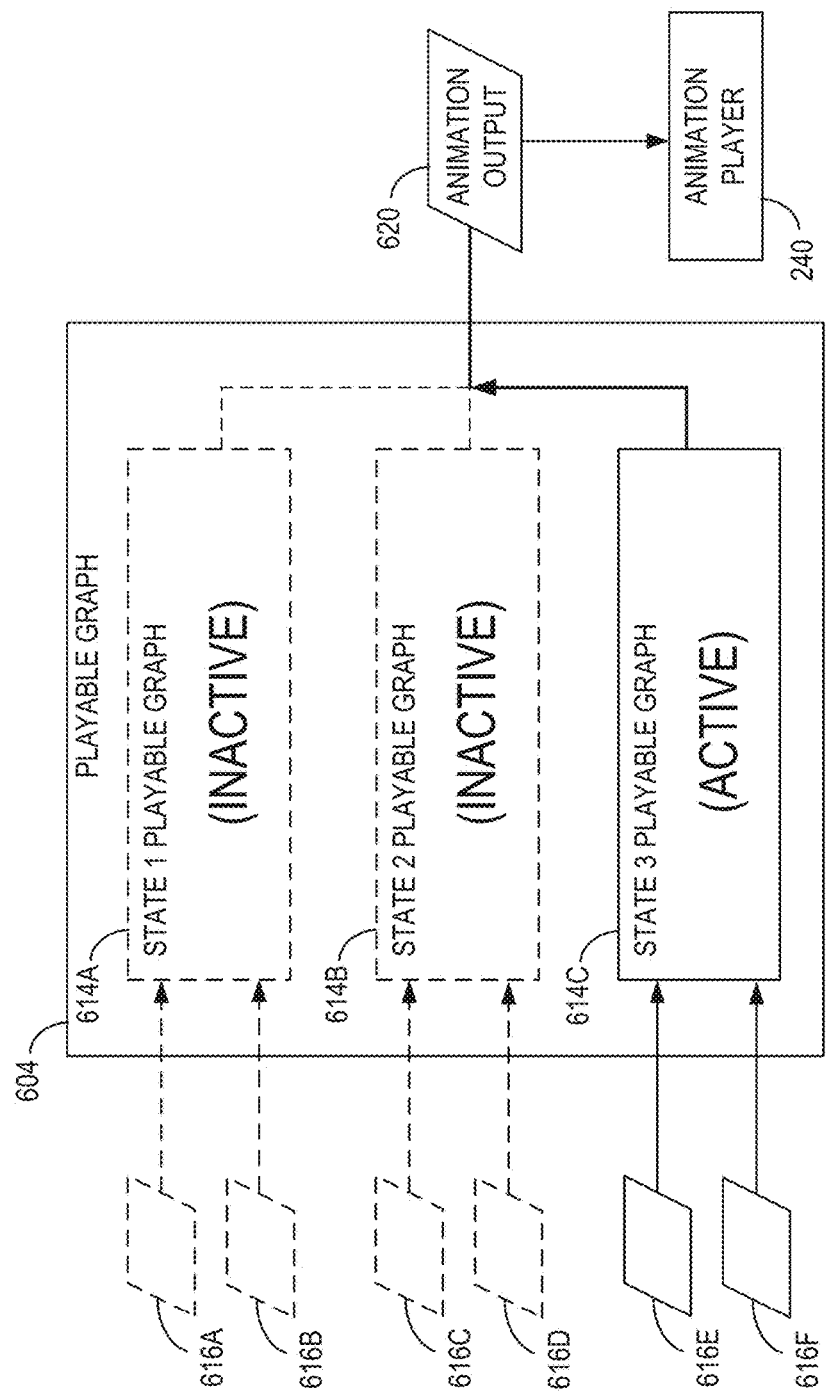
FIG. 6B is an associated state machine playable graph created from the state machine playable asset shown in FIG. 6A.

FIG. 6A is an example state machine playable asset (SMPA) 600 and FIG. 6B is an associated state machine playable graph 602 created from the state machine playable asset 600. A state machine playable asset is a playable asset that contains the information to build a state machine which selects states for multiple playable assets (e.g., depending on input from a user). The state machine playable asset 600 may be similar to the sequence playable assets 500, 550. In the example embodiment, the contents of the state machine playable asset 600 include information for building the state machine playable graph 602 (e.g., at runtime). The state machine playable graph 602 defines the various states 610A, 610B, 610C (collectively, states 610) of the state machine playable asset 600, and an associated playable asset 612A, 612B, 612C (collectively, playable assets 612) used for each state. Playable assets 612 may be similar to playable assets 200, 300, 400, 500, 550. Prior to runtime, and as shown in FIG. 6A, the state machine playable asset 600 defines each state 610 to include an associated animation playable asset 612A, 612B, 612C, respectively (collectively, "animation playable assets 612").

At runtime, and as shown in FIG. 6B, each state 610 includes an associated animation playable 614A, 614B, 614C, respectively (collectively, "animation playables 614"). In the example shown here, the graphs 614A and 614B of inactive states 610A and 610B are inactive within the larger graph 604 (e.g., illustrated by broken line), and the graph 614C of the active state 610C is active (illustrated in solid line) and is used to generate an animation output 620.

During operation, the asset player module 110 executes the state machine playable asset 600, spawning the state machine playable graph 602 (e.g., at run time), which represents the state machine playable asset 600 (e.g., for each frame). The asset player module 110 attaches playables 612 for each state 610 (e.g., where the playable assets 612 are converted at runtime to the graphs 614 that represent them). In the example shown in FIG. 6B, the three states 610 each have an associated animation asset 612 such that when the state machine playable asset 600 is in state 1 610A, the asset player module 110 uses animation playable 1 612A, when the state machine playable asset 600 is in state 2 610B, the asset player module 110 uses animation playable 2 612B, and when the state machine playable asset 600 is in state 3 610C, the asset player module 110 uses animation playable 3 612C. A state layer mixer (not shown in FIG. 6) may be used to transition from one state 610 to another, depending on the gameplay. At each frame, the state machine playable graph 602 is evaluated and the appropriate playable 612 is used.

Figure 7A:
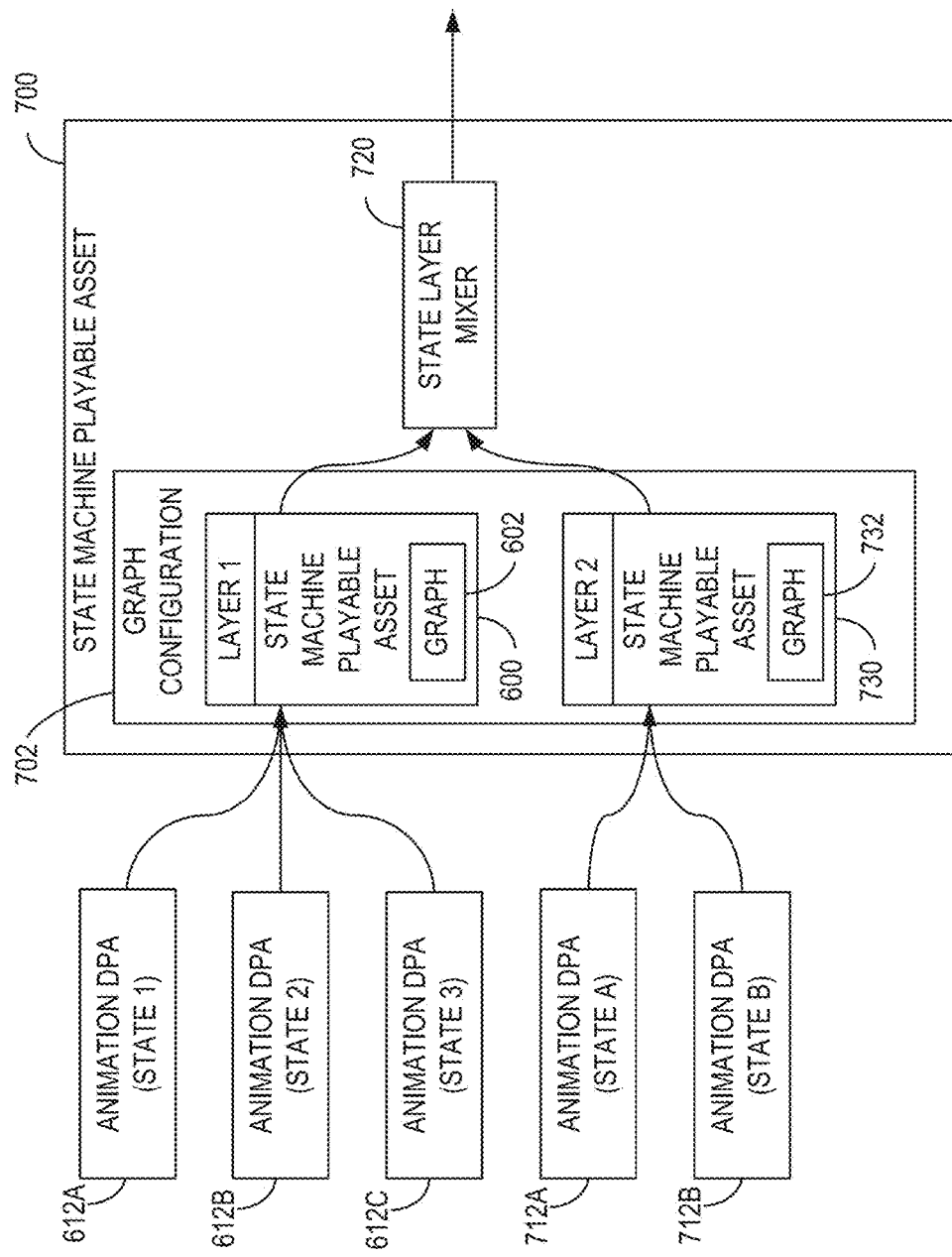
FIG. 7A is an example data flow diagram of a multi-layered state machine playable asset having multiple "nested" state machine playable assets.

FIG. 7A is an example data flow diagram of a multi-layered state machine playable asset 700 having multiple "nested" state machine playable assets 600, 730. In the example embodiment, the state machine playable asset 700 includes a graph configuration identifying the state machine playable asset 600 shown in FIG. 6A, as well as another state machine playable asset 730, which may be similar to the state machine playable asset 600. Each state machine playable asset 600, 730 is associated with a separate layer of an animation output (not separately shown in FIG. 7A). Further, the layer 1 state machine playable asset 600 includes or otherwise references the three animation DPAs 612A, 612B, and 612C (e.g., one for each state, as shown in FIGS. 6A & 6B), and the layer 2 state machine playable asset 730 includes a graph configuration 732 identifying or otherwise referencing two animation DPAs 712A and 712B (collectively, animation DPAs 712), one for each of two states. During operation, the outputs of the two state machine playable assets 600, 730 are sent through a state layer mixer 720 to generate the animation output, which is then sent to the animation player 240 for presentation to a user, as described below with respect to FIG. 7B.

Figure 7B:
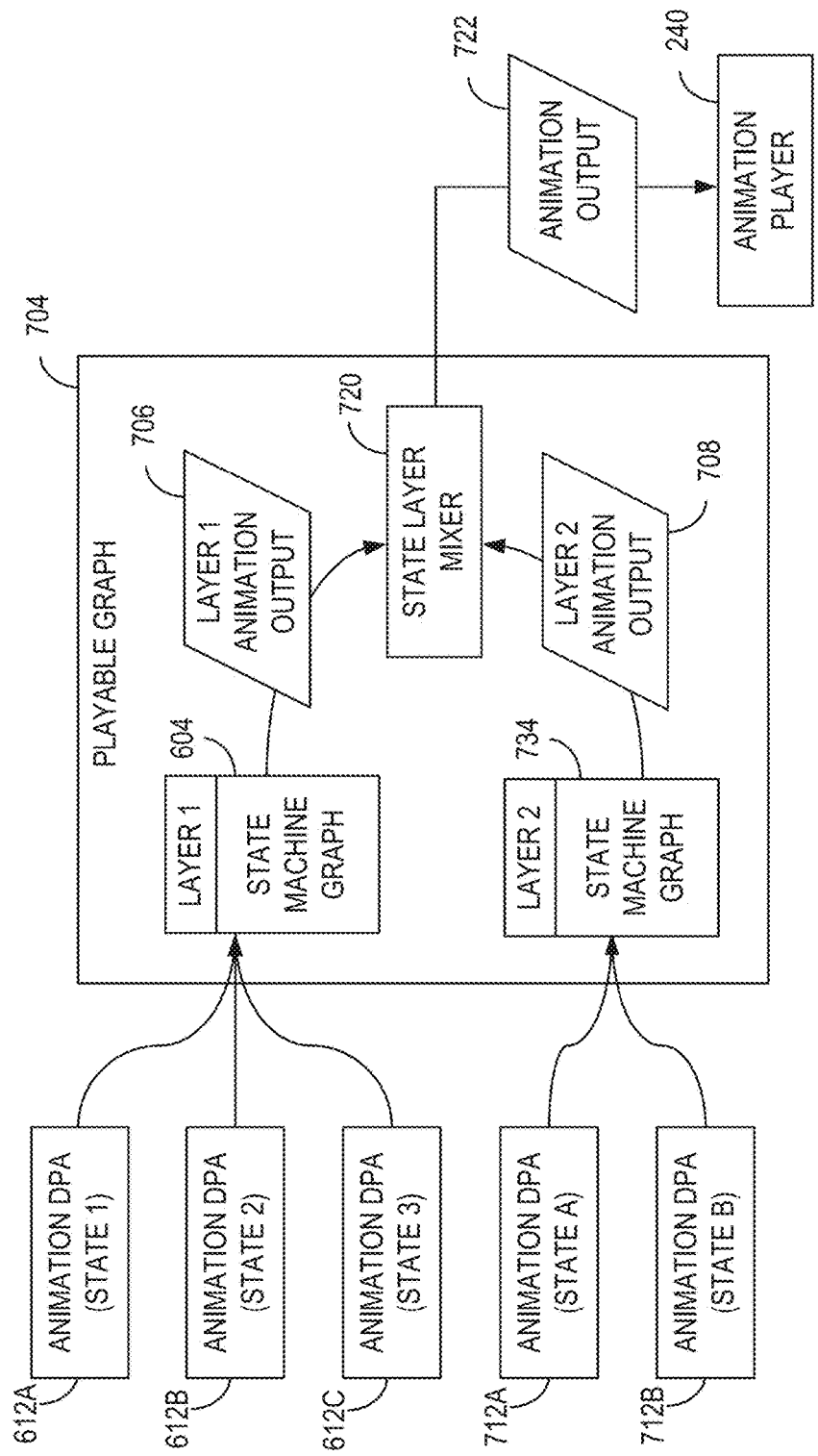
FIG. 7B illustrates a state machine playable graph for the state machine playable asset shown in FIG. 7A.

FIG. 7B illustrates a state machine playable graph 704 for the state machine playable asset 700. During operation, and in the example embodiment, the asset player module 110 executes (e.g., at run time) the state machine playable asset 700, instantiating the playable graph 704 for the state machine playable asset 700 from the graph configuration 702. This playable graph 704 includes both the state machine graph 604 representing the state machine playable asset 600, and a state machine graph 734 representing the state machine playable asset 730. As the graph 704 is executed, the layer 1 graph 604 generates a layer 1 animation output 706, and the layer 2 graph 734 generates a layer 2 animation output 708. These two outputs 706, 708 are sent to the state layer mixer 720, which combines the two outputs 706, 708 to generate an animation output 722, which may then be presented to a user via the animation player 240.

During gameplay, the asset player module 110 uses the state machine playable asset 700 to create and execute the state machine playable graph 704. For each of the nested state machine playable assets 600, 730, one animation DPA 612, 712 is used for each layer based on the state of each of the state machine playable assets 600, 730, respectively. For example, presume state 2 is active for the state machine playable asset 600, and state A is active for the layer 2 state machine playable asset 730. As such, the layer 1 animation output 706 is generated from the layer 1 graph 604 based on the state 2 animation DPA 612*b* (e.g., from the state 2 playable graph 614B component of the playable graph 604), and the layer 2 animation output 708 is output from the layer 2 graph 734 based on the state A animation DPA 712A. The state layer mixer 720 mixes (e.g., combines) the layer 1 and layer 2 animation outputs 706, 708 to generate the animation output 722. The animation output 722 may include, for example, an animation pose that is updated at each frame by the asset player module 110. Although the state layer mixer 720 is shown as a part of the state machine playable asset 700, it should be understood that the mixer 720 may be external to the state machine playable asset 700 (e.g., referenced by the state machine playable asset 700).

Referring now to FIGS. 6A-7B, for example, presume an in-game character (e.g., a swashbuckling pirate) holds an object in his hand, such as a sword. Given this situation, the layer 1 state machine playable asset 600 may represent the character's movement in the game environment (e.g., three states, including standing, running, and jumping). The layer 2 state machine playable asset 730 may represent the character's movement with respect to the held object (e.g., two states, including holding the sword at their side and swinging the sword in a slashing motion). Accordingly, based on the character's state within the game (e.g., running and swinging sword, standing and holding sword, and so forth), the state machine playable asset 700 provides a playable animation associated with each of the particular states (e.g., running, from the state 2 animation DPA 614B, as the layer 1 output 706, and swinging the sword, from the state B animation DPA 714B, as the layer 2 output 708). The asset player module 110, via the state layer mixer 720, combines the layer 1 and layer 2 animations 706, 708 to generate the animation output 722, which includes the character both running and swinging the sword.

In the example embodiment, playable assets solve problems and distill issues for the user in a package that can be used and reused multiple times. For example, in a user's project folder, the user may have traditional assets such as characters, voices, and scenes, but the user may also have playable assets like the sequence playable assets 500, 550 or the state machine playable asset 600, 700. Authors can create playable assets and then reuse those playable assets multiple times within a game. Such playable assets may drive animation, audio, or video, thereby providing a powerful and flexible tool for game developers.

In some embodiments, playable assets may be nested inside other playable assets. For example, DPAs, sequence playable assets, and state machine playable assets each may be either nesting playable assets or nested playable assets. The term "nesting playable asset," as used herein, refers to a playable asset that includes (e.g., references) another playable asset. The term "nested playable asset," as used herein, refers to a playable asset that is included within (e.g., referenced by) another playable asset. In other words, a nesting playable asset includes at least one nested playable asset. Such nesting may be thought of or described in terms of a family hierarchy, where, for example, a nesting playable asset is the parent of a child nested playable asset. Playable assets may be nested in many layers (e.g., where nested playable assets may also be parents of other nested playable assets).

In some embodiments, playable assets can be nested with mixed playable asset types. For example, a state machine playable asset can be nested inside another state machine playable asset, or within a sequence playable asset, or within a custom playable asset, or vice versa. This enables a developer, for example, to build a state machine playable asset, where each state contains a different sequence playable asset to be played depending on the gameplay of the user. Similarly, a sequence playable asset could contain a state machine playable asset such that a section of the sequence playable asset may be determined by the gameplay of the user via the state machine playable asset.

In some embodiments, some playable assets such as sequence playable assets may be implemented as pass-through objects (e.g., they have at least as many inputs as outputs). The inputs and outputs may be matched by data type such that, for example, animation data (e.g., including parts of an animation playable graph) on an input may be matched with an element that accepts animation data on the output (e.g., an animation player, or an animation mixer, or any other animation processing node). Similarly, audio data (e.g., including parts of an audio playable graph) on an input may be matched with an element that accepts audio data (e.g., including audio players, audio mixers or any other audio processing node) on the output, and video data (e.g., including video playables and parts of a video playable graph) on an input may be matched with an element that accepts video data (e.g., including video players, video mixers and any other video processing node) on the output.

Accordingly, some playable assets may be content agnostic elements which do not restrict the type of content which they are processing (e.g., they do not need to play the content, but rather they pass the content through). In other words, a single playable asset may handle audio, video, and animation content in a similar way without needing to be modified to handle the different input types. For example, a particular sequence playable asset created for audio may be used to process video in the same way.

Figure 8B:
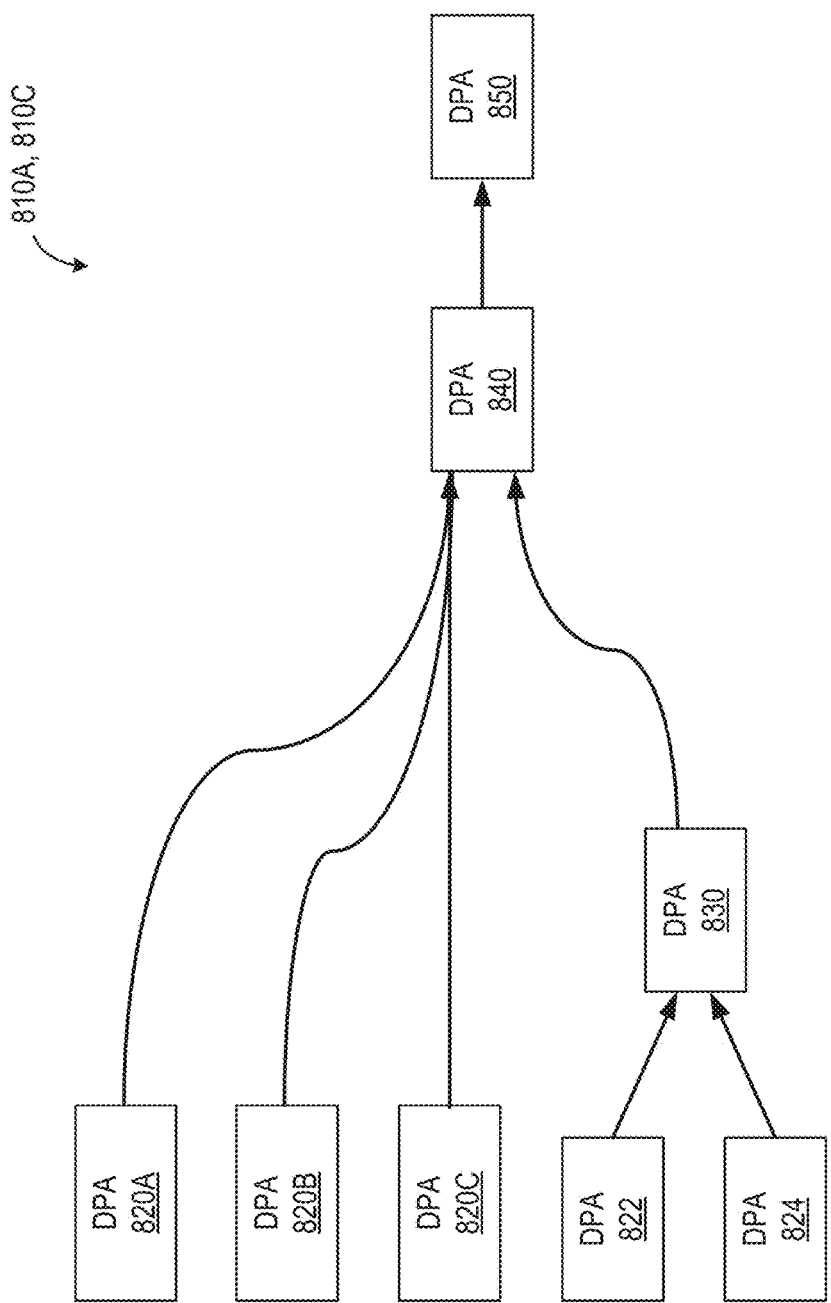
FIG. 8B illustrates the graph shown in FIG. 8A at the first point in time.
Figure 8C:
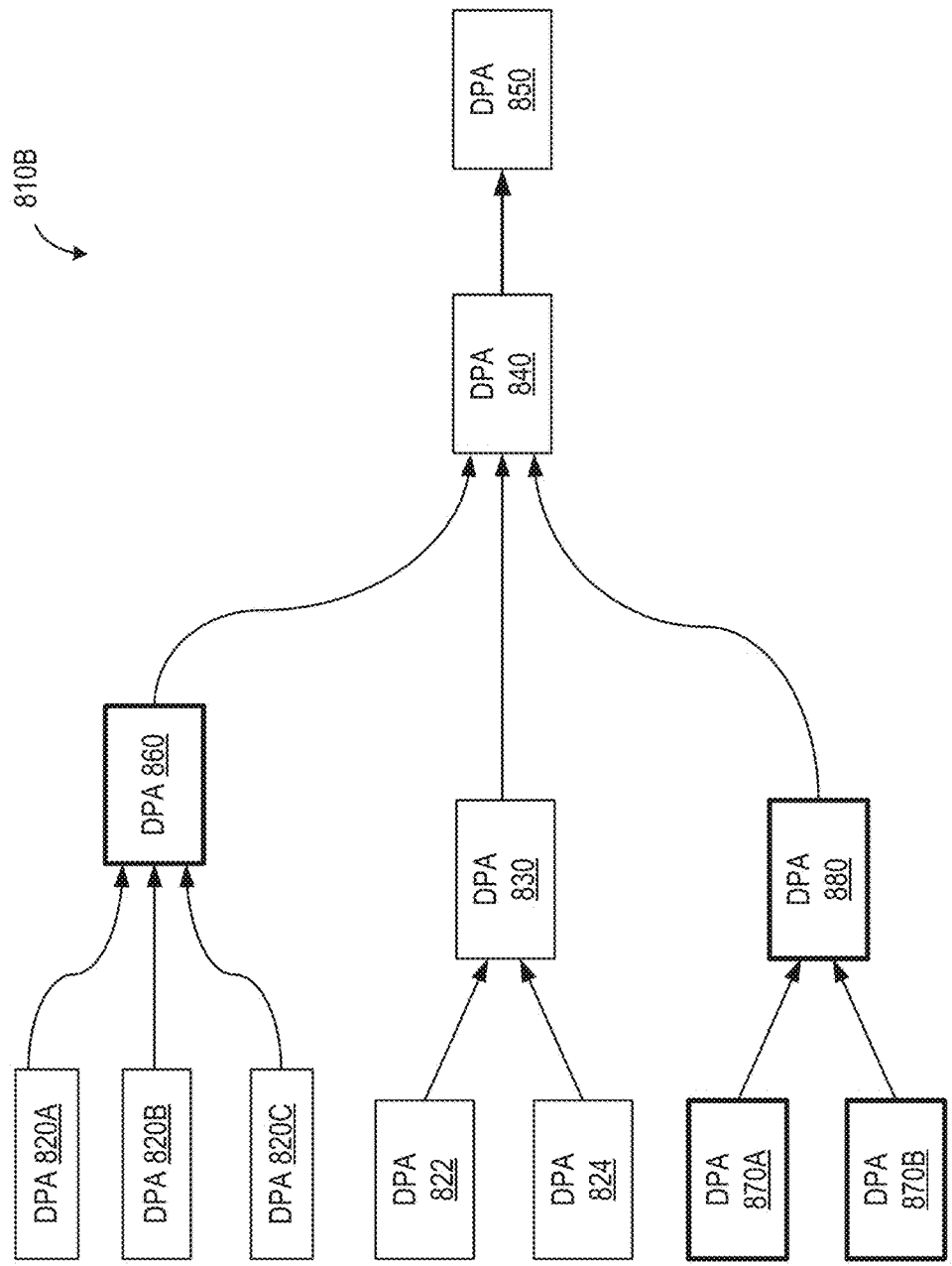
FIG. 8C illustrates the playable graph shown in FIG. 8A at the second point in time 806B.

FIG. 8A-8C illustrate the dynamic nature of playable graphs provided by the asset player module 110 during execution. FIG. 8A illustrates an example computer-generated environment 800 (e.g., a 3D gaming environment) in which an avatar 802 (e.g., an in-game character) walks through a tunnel 804. In the example embodiment, at a first point in time 806A, the avatar 802 is walking in an outdoor setting toward the tunnel 804. At a second point in time 806B, the avatar 802 is walking through the tunnel 804 (e.g., from left to right, as shown in FIG. 8A). At a third point in time 806C, the avatar 802 has emerged from the tunnel 804 and continues walking in the outdoor setting.

The sound and the sound effects that are applied during the various points in time 806A, 806B, 806C (collectively, times 806) may differ. For example, the sound of the avatar's 802 shoes along the ground may be different within the tunnel 804 from the sound when walking outside of the tunnel 804, such as echoes when within the tunnel 804, or the sound of different ground textures (e.g., walking on dirt in the outdoor environment, or walking on concrete or stone within the indoor environment). As such, the sounds at each time 806 may be processed differently.

In the example embodiment, FIG. 8A also depicts a graph 810 associated with the avatar and, more specifically, with audio associated with the movement of the avatar through the environment 800. In other words, the playable graph 810 is used to generate an audio output associated with the avatar 810 walking through the environment 800 that is presented to the user 101 during gameplay (e.g., through a conventional media player). The playable graph 810 is initially created (e.g., in memory) at runtime by the asset player module 110 from a playable asset associated with avatar movement (not separately shown in FIG. 8A). The playable asset may be similar to any of the playable assets shown and described above. Further, and as depicted in FIG. 8A, the graph 810 may change during execution (e.g., based on events and the circumstances of gameplay). For example, parts of the graph 810 can disappear at certain times and then reappear at later times, or completely new sections can be added to the graph 810, or existing sections deleted.

FIG. 8A illustrates the playable graph 810 at the various points in time 806. More specifically, at time 806A, the graph 810 is in a state illustrated as graph 810A, at time 806B, the graph 810 is in a state illustrated as graph 810B, and at time 806C, the graph is in a state illustrated as graph 810C. In the example shown in FIG. 8A, the state of the graphs 810A, 810C (e.g., while the avatar 802 is outside the tunnel 804) are different than the state of the graph 810B (e.g., while the avatar 802 is inside the tunnel 804). More specifically, while the avatar 802 is inside the tunnel 804, an entire new branch is added to the graph 810, and a new element is added to an existing part of the graph 814. FIGS. 8B and 8C illustrate these dynamic changes to the graph 810.

FIG. 8B illustrates the graph 810 at the first point in time 806A, as graph 810A. In the example embodiment, during gameplay, the avatar 802 is walking around outside the tunnel 804 at time 806A, and the asset player module 110 is using the graph 810A to generate an output audio playable 820 that is presented to the user 101. The output audio playable 820 may be similar to the output audio playable 330. Graph 810A includes multiple dynamic playable assets 820A, 820B, 820C, and 822 as inputs to dynamic playable assets 840 and 830, respectively. The dynamic playable asset 840 is an input to the dynamic playable asset 850 which creates, as its output, the example audio of the avatar 802 walking.

FIG. 8C illustrates the playable graph 810 at the second point in time 806B, as graph 810B. In the example embodiment, sometime between the first point in time 806A and the second point in time 806B, the avatar 802 walks into the tunnel 804. Upon entry into the tunnel 804, the graph 810 used to generate the sound coming from the movement of the avatar 802 changes from graph 810A to graph 810B (e.g., to add, change, or delete audio effects to simulate tunnel walking, such as echo effects, or walking on a different texture of ground). Graph 810B is a modification of graph 810A. More specifically, a new dynamic playable asset 860 is added between the DPAs 820A, 820B, 820C and the DPA 840, and a new branch is added with dynamic playable assets 870A, 870B, and 880. The newly added graph components are illustrated in bolded line in FIG. 8C.

The added branch may, for example, represent the addition of a completely new sound such as the sound of dripping water, or the wind rushing through the tunnel, or the combination of both of those sounds. The added process 832 to the existing branch may, for example, represent an audio modification applied to existing sound in the graph 814. For example, it could be the addition of an echo to the footstep sound, or another audio process, and/or the addition of a crunching sound to the footstep sound due to dirt, leaves and other garbage on the tunnel 804 floor. In some embodiments, the transition from graph 810A to graph 810B can be gradual (e.g., to allow for the sound to gradually change as the character 820 enters the tunnel 822).

In the example embodiment, sometime between the second point in time 806B and the third point in time 806C, the avatar 802 walks out of the tunnel 804. Upon existing the tunnel 804, the graph 810 used to generate the sound coming from the movement of the avatar 802 changes from graph 810B to graph 810C (e.g., to add, change, or delete audio effects to simulate outdoor walking). Graph 810C is a modification of graph 810B. More specifically, the branch 830 is removed, and the process 999 is removed from the branch 832. In this example, the audio for the avatar 802 returns back to outdoor walking, similar to graph 810A.

Referring now to FIGS. 8A-8C, at runtime, in the example embodiment, playable graphs such as the graph 810 (e.g., in each of the various stages 810A, 810B, 810C) are traversed using a traverser (e.g., a programmatic object). In the example embodiment, the traverser (not separately depicted) is a component of the asset player module 110. The traverser prepares and executes the different parts of the graph. More specifically, each frame (e.g., for each image frame created by the game engine 112) undergoes a prepare pass and a processing pass through the traverser.

In the example embodiment, the prepare pass determines the parts of a graph that need to be processed and stages the data for the processing pass. In some embodiments, the graph 810 may be modified (e.g., data and topology) during the prepare pass. For example, the graph 810 may be modified to eliminate portions of the graph that do not need to be processed (either because the data is not ready for processing or because of an input from the user or because of game script or for any other reason that a portion of the graph is not be be processed). For another example, the graph 810 can be modified to add new sections to the graph based on scripting, or the availability of data, or input from the user (e.g., during gameplay).

In some embodiments, during the prepare pass for each frame, the traverser may create a topology hash of the graph 810 at that moment. The topology hash may be used to determine if the graph 810 has changed relative to the previous frame. For each frame, the traverser applies a hash function to the graph structure to create a graph topology identifier (ID) (e.g., a hash value). Thus, the traverser may compare the graph topology ID of a current frame to the graph topology ID of a previous frame in order to determine whether something has changed in the graph 810.

In the example embodiment, during the prepare pass, the traverser checks for trigger events. A trigger event can be triggered, for example, by a user's game play, or from a script within the game. If a trigger event exists, then the traverser determines whether the data is ready to react to that event, and whether the event should be acted upon. Not all events may be acted upon immediately. For example, the user 101 may click a mouse multiple times in a second, but the graph for that mouse click event may only be executed once per second regardless of the number of clicks. The processing pass determines when the graph 810 gets processed by the player or players to which the graph is connected. During the processing pass, the player attached to the graph causes the playables in the graph to execute according to the specifics within the playables.

In the example embodiment, the topology of the graph 810 and the data within the graph 810 is fixed during the processing pass. If the prepare pass determines that some aspect of the graph does not need to be processed, then that part of the graph will be ignored during the processing pass. This dual pass methodology makes the asset player module 110 more efficient and allows the use of multithreading to optimize processing.

Figure 9:
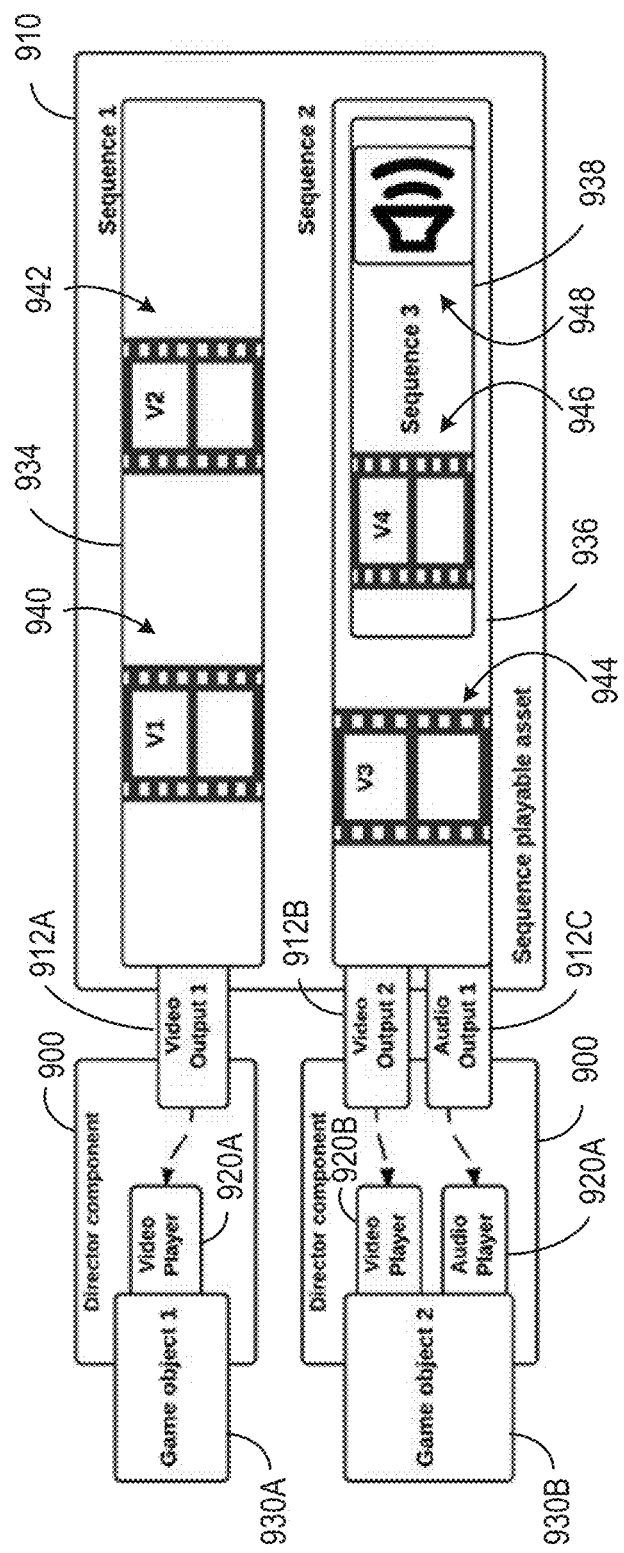
FIG. 9 is a diagram of a director component ("director") that implements the playable asset and graph system and other methods described herein

FIG. 9 is a diagram of a director component ("director") 900 that implements the playable asset and graph system and other methods described herein. In the example embodiment, the director 900 is implemented as a game object component (e.g., where game objects have many different components, each component defining some aspect of the object such as size, position, orientation, animation, rendering, audio, events, scripting, and the like). The director 900 is a component that assigns (e.g., connects) playable assets, such as a sequence playable asset 910, to conventional media players 920, such as the audio player 340, the video player 440, or the animation player 240. The sequence playable asset 910 may be similar to the sequence playable assets 500, 550. More specifically, the director 900 connects the outputs 912 of the playable asset 910 with the appropriate property of a game object 930A, 930B (collectively, game objects 930). It does this by connecting the output 912 of the playable asset 910 with the input from the media player 920 that understands the output of the particular type of playable asset 910. For example, and as shown in FIG. 9, the director 900 connects a video output 912A from the playable asset 910 with a video player 920A in the game object 930A. The director 900 also connects a video output 912B from the playable asset 910 with a video player 920B in a different game object 930B, as well as an audio output 912C with an audio player 920C in the game object 930B.

In some embodiments, the game objects 930 may include the media player(s), which may affect a property from the game object 930 such that, when the output of the playable asset 910 is connected to the appropriate media player 920, the game object property is affected at a particular time, and in a particular way.

In the example embodiment, the director 900 instantiates the playable asset 910 (e.g., creates a playable graph such as the playable graph 300) and uses the playable graph (not shown in FIG. 9) to generate one or more playables (e.g., the outputs 912) that it then passes to the appropriate game object media players 920. The playable graph is created when the asset 910 is bound to the director 900 (e.g., at runtime). As outputs 912 are created, the director 900 hands over the resultant outputs 912 to the game object media player 920 in a form that the media player 920 supports. The media player 920 then presents the outputs 912 to the user 101.

In the example embodiment, the playable graph includes several separate branches, where each branch is linked to an output. The media player that is connected to the output of the playable asset 910 executes the branch of the playable graph that connects to the output. For example, the video player 920A that is connected to video output 1 912A of the playable asset 910 will execute the branch of the playable graph that connects to the video output 1 912A. The branch of the playable graph will generate a video playable that will be played by the video player 920A and exposed to the user via the game object 930A (e.g., a video displayed on a screen on the game object during gameplay). Similarly, the video player 920B that was connected to video output 2 912B of the playable asset 910 will execute the branch of the playable graph that connects to the video output 2 912B. The branch of the playable graph will generate a video playable that will be played by the video player 920B and exposed to the user via the game object 930B (eg. a video displayed on a screen on the game object during gameplay). Also, audio player 920C that was connected to audio output 1 912C of the playable asset 910 will execute the branch of the playable graph that connects to the audio output 1 912C. The branch of the playable graph will generate an audio playable that will be played by the audio player 920C and exposed to the user via the game object 930B (eg. a sound generated by the object during gameplay). The media players 920A, 920B, 920C are responsible for playing the playables 912A, 912B, 912C.

In the example shown in FIG. 9, the sequence playable asset 910 contains two sequences, Sequence-1 934, and Sequence-2 936. Sequence-1 934 contains two video clips V1 940 and V2 942, and is configured to generate video output 912A. Sequence-2 926 contains a video clip V3 944 and an embedded sequence, Sequence-3 938. Sequence-3 938 includes its own video clip(s) V4 946 and audio clip(s) 948. Sequence-2 936 is configured to generate video output 912B and audio output 912C. In some embodiments, the sequence playable asset 910 could also contain state machines and other sequences. Sequence-3 938 contains the data to expand itself into a graph, the output of which feeds into Sequence-2 936. Sequence-3 938 includes both video and audio, and therefore it has two types of output (e.g., one for each type, not separately shown in FIG. 9). Similarly, since Sequence-3 938 is embedded in Sequence-2 936, Sequence-2 936 also has two types of output (e.g., video output 912B and audio output 912C). This sequence within the sequence (e.g., a "nested sequence") creates, at runtime, a sequence playable graph that integrates with the sequence playable graph of the parent sequence playable asset.

Figure 10:
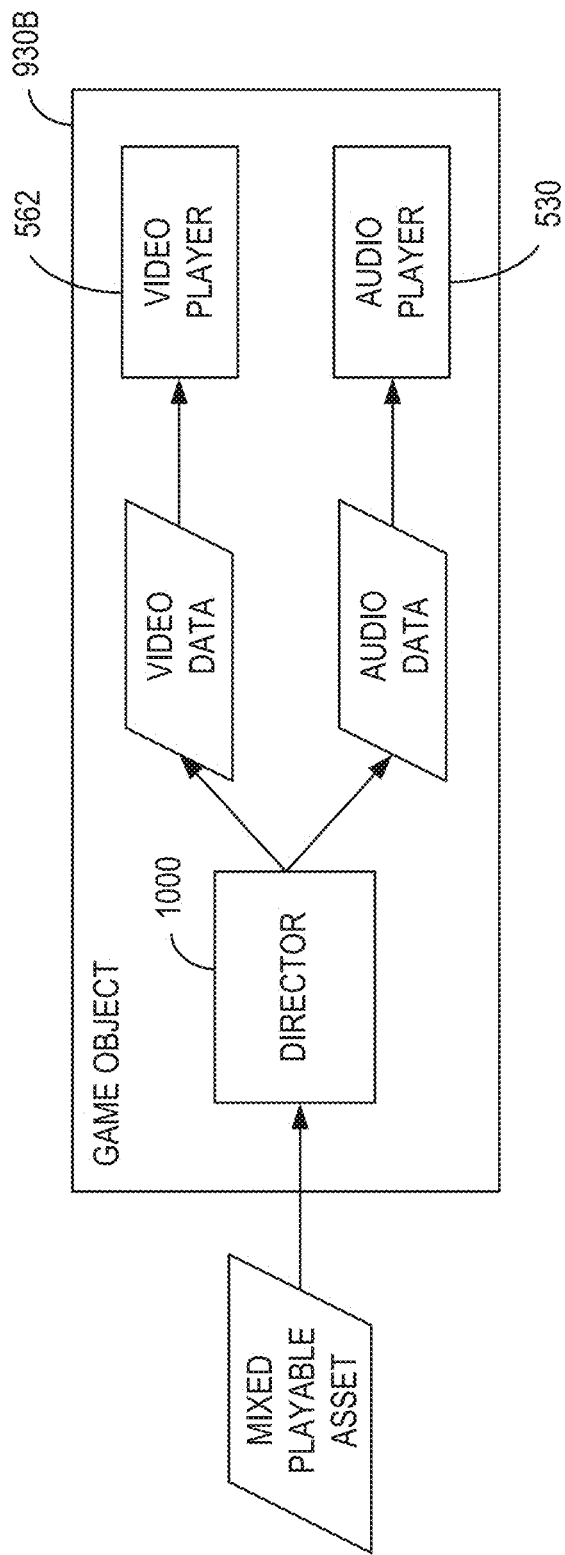
FIG. 10 illustrates components and associated data flow of the example game object shown in FIG. 9.

FIG. 10 illustrates components and associated data flow of the example game object 930B shown in FIG. 9. The game object 930B includes the director component 900, as well as media players 920 such as the video player 562 and the audio player 530. The director component 900 for the game object 930B connects the output of the SPA to the appropriate player attached to that game object. More specifically, each output for S1 930 and S2 932 is connected to the input of the appropriate player (e.g., in this case a video or audio player) attached to the game object 930B. The director component 900 matches the data type for the playable asset output 912 with the media player input attached to the game object 930B. As such, playable assets that produce video playables are connected to video players 562, and playable assets that produce audio playables are connected to audio players 530.

FIG. 11 is a user interface (UI) 1100 for creating sequence playable assets such as the sequence playable asset 910 shown in FIG. 9. The UI 1100 is a graph-generating logic tool for creating the sequence playable asset 910. Some known UIs that implement timelines do so by creating scripts to synchronize various elements together. Here, the UI 1100 enables a developer to create graphs (e.g., graph-generating data structures) for sequence playable assets. In the example shown in FIG. 11, the developer is animating two objects in a scene 1112. The first object is a dark knight 1114 which has several animations related to fighting with swords. The second object is a white knight 1116, which also has several animations related to fighting with swords.

In the example embodiment, a top portion 1110 of the UI 1100 shows a layout of the UI 1100 for the sequence playable asset 910, while a bottom portion 1120 includes a timeline 1130 representing various elements of the sequence playable asset being created within the UI 1100. The example timeline 1130 includes a first object timeline (or "dark knight timeline") 1140 representing the dark knight 1114 and a second object timeline (or "white knight timeline") 1150 representing the white knight 1116. The dark knight timeline 1140 includes a right arm swing animation 1142, a lunge animation 1144, and a left arm block animation 1146. The white knight timeline 1150 includes two animations, an idle animation 1152 and a left arm block animation 1154. The timelines 1140, 1150 are aligned based on the timing of their occurrence in the scene 1112 (e.g., when they occur relative to each other, and relative to the shared timeline 1130). A broken vertical line 1122 on the UI 1100 indicates the frame currently playing, or displayed on the UI 1100. The broken vertical line 1122 acts as a pointer or time marker within the scene 1112 along the shared timeline.

In the example shown here, the right arm swing animation 1142 of the dark knight 1114 starts just before, and runs contemporaneously with, the idle animation 1152 of the white knight 1116. The lunge animation 1144 of the dark knight 1116 is introduced near the end of the right arm swing animation 1142, and runs contemporaneously with the left arm block animation 1154 of the white knight 1116. The left arm block animation 1146 of the dark knight 1114 begins near the end of the lunge animation 1144, briefly overlapping with the end of the left arm block animation 1154 of the white knight 1116.

Figure 12:
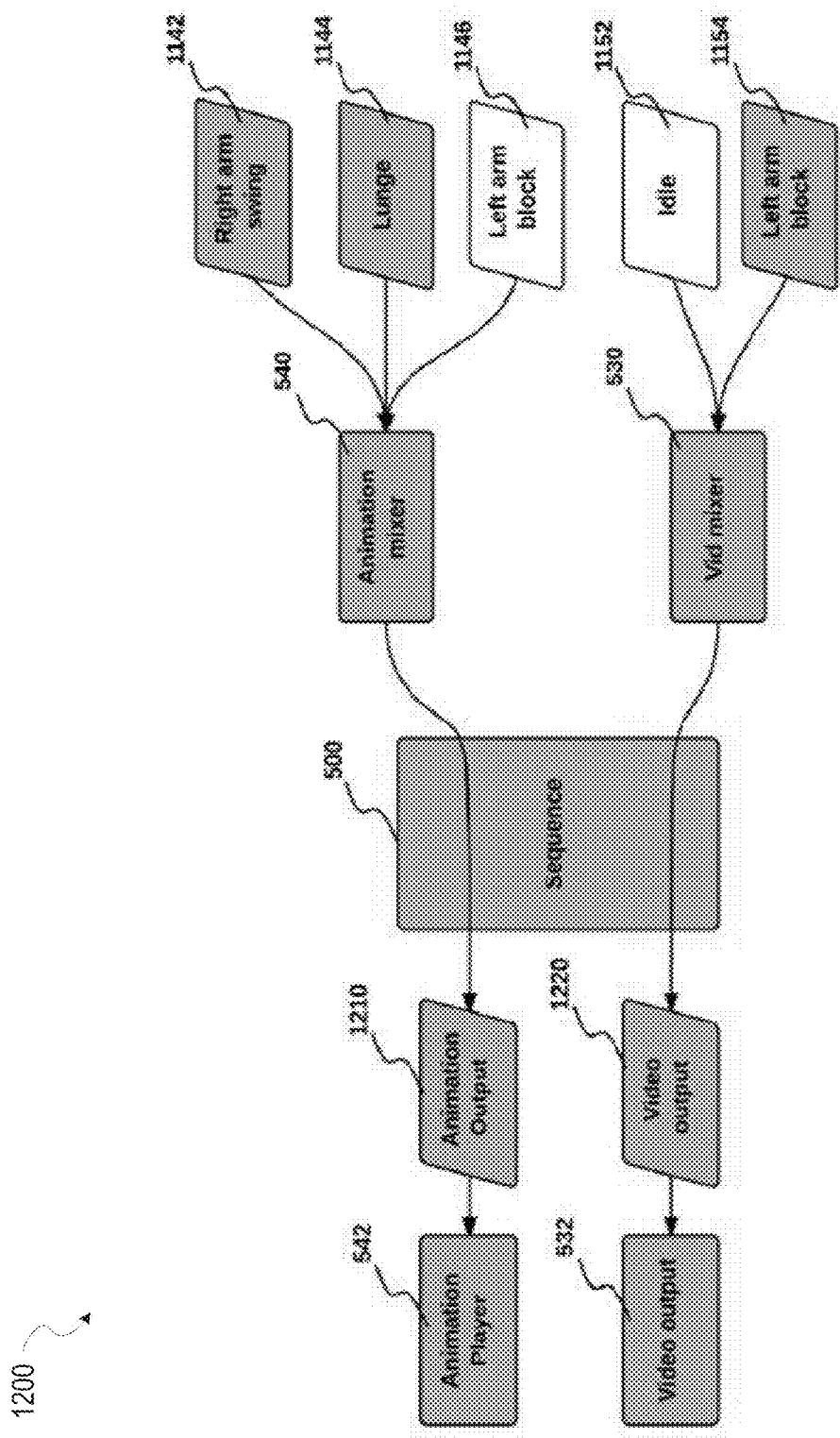
FIG. 12 illustrates a playable graph for the scene and associated playable assets and objects shown in FIG. 11.

FIG. 12 illustrates a playable graph 1200 for the scene 1112 and associated playable assets and objects 1114, 1116 shown in FIG. 11. In the example embodiment, the current frame in the timeline 1130 is represented by a particular pass through the graph 1200. Different parts of the graph 1200 may be active at different points in time. In the example shown here, the shaded regions illustrate the parts that would be active at the time indicated by the broken vertical line 1122 shown in FIG. 11.

Referring now to FIGS. 11 and 12, the active elements of the graph 1200 are updated at each frame, where the active elements are identified based on the timeline 1130 at the particular frame (e.g., as identified by the broken vertical line 1122). FIG. 11 shows that, for the current frame, the broken vertical line 1122 passes through the first object timeline 1140 of the dark knight 1114 when the right arm swing animation 1142 and the lunge animation 1144 are fading into each other. At this time, the graph 1200 shows that both of those animations 1142, 1144 are active (e.g., both overlap with the broken vertical line 1122). In other words, at this frame, the dark knight 1114 will be both swinging and lunging at the same time. The animation mixer 540 controls the appropriate amount of mixing of the two animations 1142, 1144 (e.g., based on parameters set by the user via the UI 1100). For the second object (e.g., the white knight 1116), at the same video frame, the left arm block animation 1154 of the white knight 1116 is playing (e.g., while the right arm swing animation 1142 and the lunge animation 1144 are active for the dark knight 1114).

Figure 13:
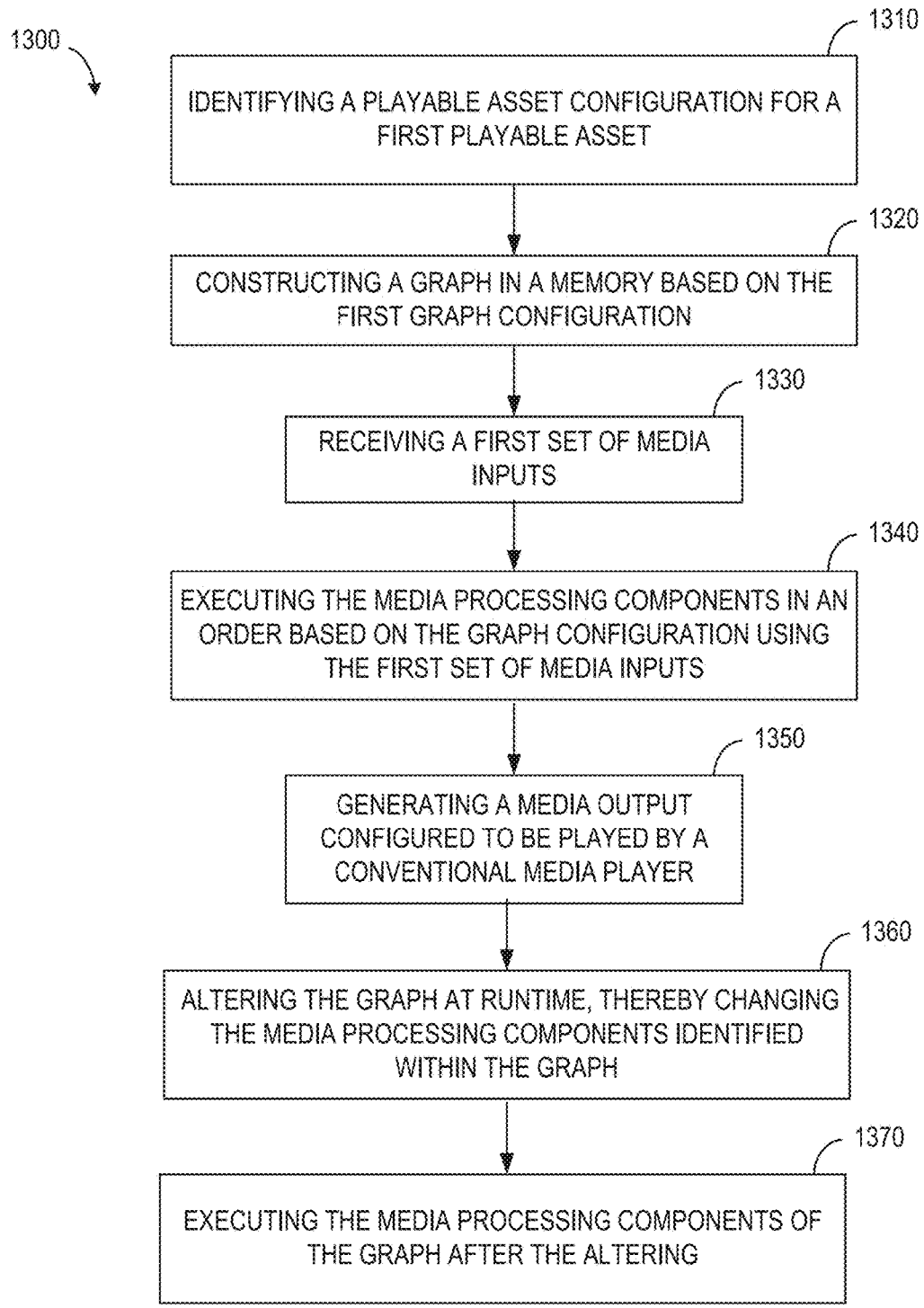
FIG. 13 is a flow chart of a computer-implemented method for providing playable assets.

FIG. 13 is a flow chart of a computer-implemented method 1300 for providing playable assets. In the example embodiment, the method 1300 is performed by a computing device comprising at least one processor, a memory, and a first hand-tracking input device. The method 1300 includes identifying a playable asset configuration for a first playable asset associated with media, the playable asset configuration includes a first graph configuration identifying a plurality of processing nodes connected by at least one directed edge, each node in the graph configuration represents a media processing component configured to modify one or more media inputs to generate a media output, the first playable asset accepts one or more input media components (see operation 1310). The method 1300 also includes constructing a graph in a memory based on the first graph configuration (see operation 1320).

In the example embodiment, the method 1300 further includes receiving a first set of media inputs (see operation 1330). In some embodiments, at least one media input of the first set of media inputs is a second playable asset. In some embodiments, constructing the graph is further based on the second graph configuration of the second playable asset, the graph including at least the first playable asset and the second playable asset. In some embodiments, the first playable asset is associated with a first media type, wherein the second media asset is associated with a second media type different than the first media type, and executing the media processing components further includes identifying the first media type for presentation, and executing only media components in the graph associated with the first media type, thereby excluding media processing components in the graph associated with the second media type.

The method 1300 also includes executing the media processing components in an order based on the graph configuration and using the first set of media inputs as the one or more input media components (see operation 1340).

The method 1300 further includes, based on said executing, generating a media output configured to be played by a conventional media player (see operation 1350). The method also includes altering the graph at runtime, thereby changing the media processing components identified within the graph (see operation 1360). The method further includes executing the media processing components of the graph after the altering (see operation 1370).

In some embodiments, the first playable asset identifies a plurality of states and a plurality of playable assets, each state in the plurality of states is associated with one of the playable assets of the plurality of playable assets. In some embodiments, executing the media processing components further includes identifying an active state of the first playable asset, the active state identifying one of the plurality of states, and executing only the media processing components in the graph associated with the playable asset of the plurality of playable assets associated with the active state, thereby excluding media processing components in the graph of the other playable assets of the plurality of playable assets.

In some embodiments, the first playable asset also identifies a synchronizer media processing component configured to temporally synchronize two or more inputs.

The detailed examples of a system for creating game experiences, according to the disclosure, are presented herein for illustration of the disclosure and its benefits. Such examples of use should not be construed to be limitations on the logical process embodiments of the disclosure, nor should variations of user interface methods from those described herein be considered outside the scope of the present disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 14:
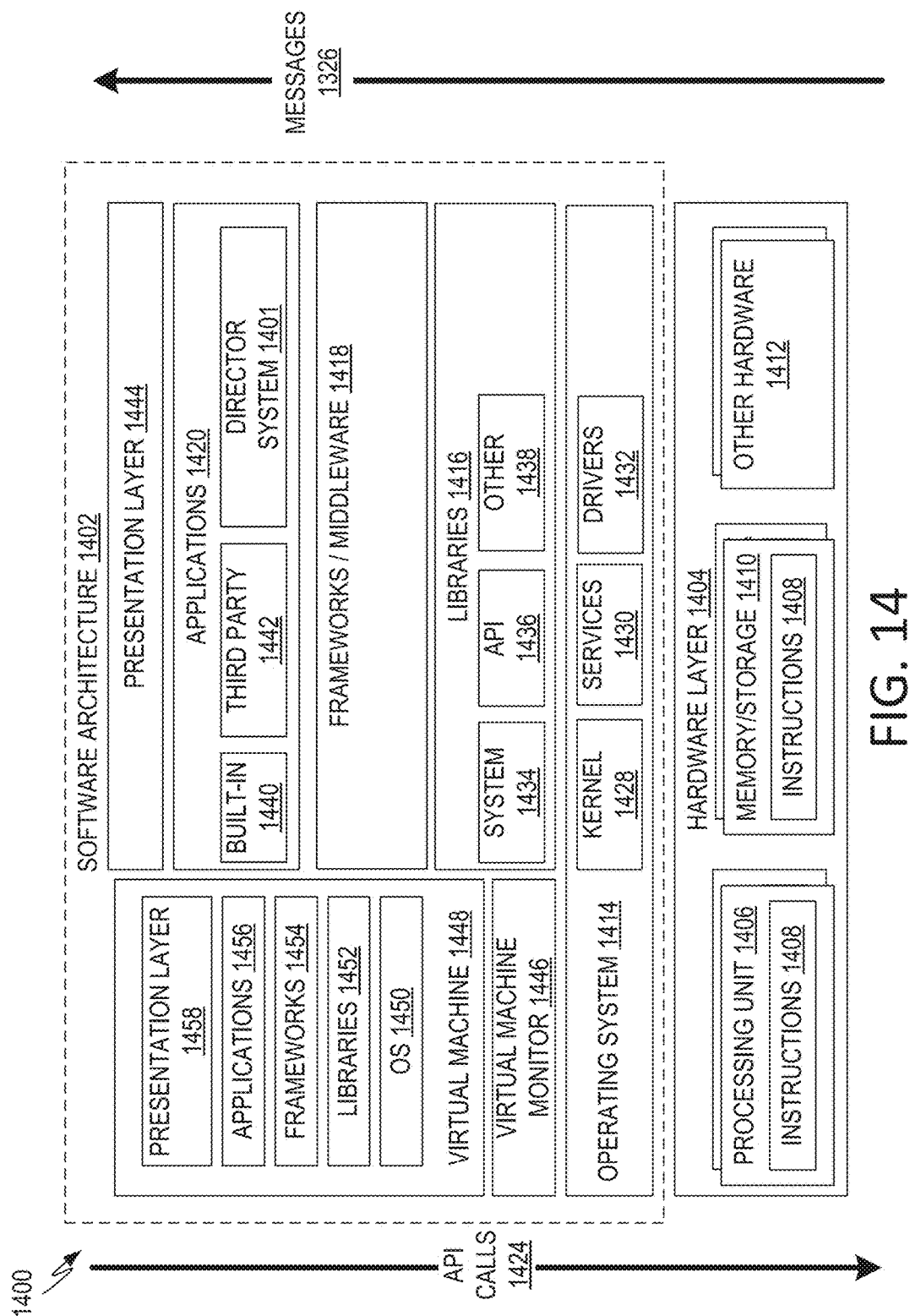
FIG. 14 is a block diagram illustrating an example software architecture, which may be used in conjunction with various hardware architectures herein described to provide a director system, which may implement any of the above-described features.

FIG. 14 is a block diagram 1400 illustrating an example software architecture 1402, which may be used in conjunction with various hardware architectures herein described to provide a director system 1401, which may implement any of the above-described features. FIG. 14 is a non-limiting example of a software architecture and it will be appreciated that many other architectures may be implemented to facilitate the functionality described herein. The software architecture 1402 may execute on hardware such as a machine 1500 of FIG. 15 that includes, among other things, processors 1510, memory 1530, and input/output (I/O) components 1550. A representative hardware layer 1404 is illustrated and can represent, for example, the machine 1500 of FIG. 15. The representative hardware layer 1404 includes a processing unit 1406 having associated executable instructions 1408. The executable instructions 1408 represent the executable instructions of the software architecture 1402, including implementation of the methods, modules and so forth described herein. The hardware layer 1404 also includes memory/storage 1410, which also includes the executable instructions 1408. The hardware layer 1404 may also comprise other hardware 1412.

In the example architecture of FIG. 14, the software architecture 1402 may be conceptualized as a stack of layers where each layer provides particular functionality. For example, the software architecture 1402 may include layers such as an operating system 1414, libraries 1416, frameworks or middleware 1418, applications 1420 and a presentation layer 1444. Operationally, the applications 1420 and/or other components within the layers may invoke application programming interface (API) calls 1424 through the software stack and receive a response as messages 1426. The layers illustrated are representative in nature and not all software architectures have all layers. For example, some mobile or special purpose operating systems may not provide the frameworks/middleware 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be used by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) provide a higher-level common infrastructure that may be used by the applications 1420 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1442 may invoke the API calls 1424 provided by the mobile operating system such as operating system 1414 to facilitate functionality described herein.

The applications 1420 may use built-in operating system functions (e.g., kernel 1428, services 1430 and/or drivers 1432), libraries 1416, or frameworks/middleware 1418 to create user interfaces to interact with users of the system. Alternatively, or additionally, in some systems, interactions with a user may occur through a presentation layer, such as the presentation layer 1444. In these systems, the application/module "logic" can be separated from the aspects of the application/module that interact with a user.

Some software architectures use virtual machines. In the example of FIG. 14, this is illustrated by a virtual machine 1448. The virtual machine 1448 creates a software environment where applications/modules can execute as if they were executing on a hardware machine (such as the machine 1500 of FIG. 15, for example). The virtual machine 1448 is hosted by a host operating system (e.g., operating system 1414) and typically, although not always, has a virtual machine monitor 1446, which manages the operation of the virtual machine 1448 as well as the interface with the host operating system (i.e., operating system 1414). A software architecture executes within the virtual machine 1448 such as an operating system (OS) 1450, libraries 1452, frameworks 1454, applications 1456, and/or a presentation layer 1458. These layers of software architecture executing within the virtual machine 1448 can be the same as corresponding layers previously described or may be different.

Figure 15:
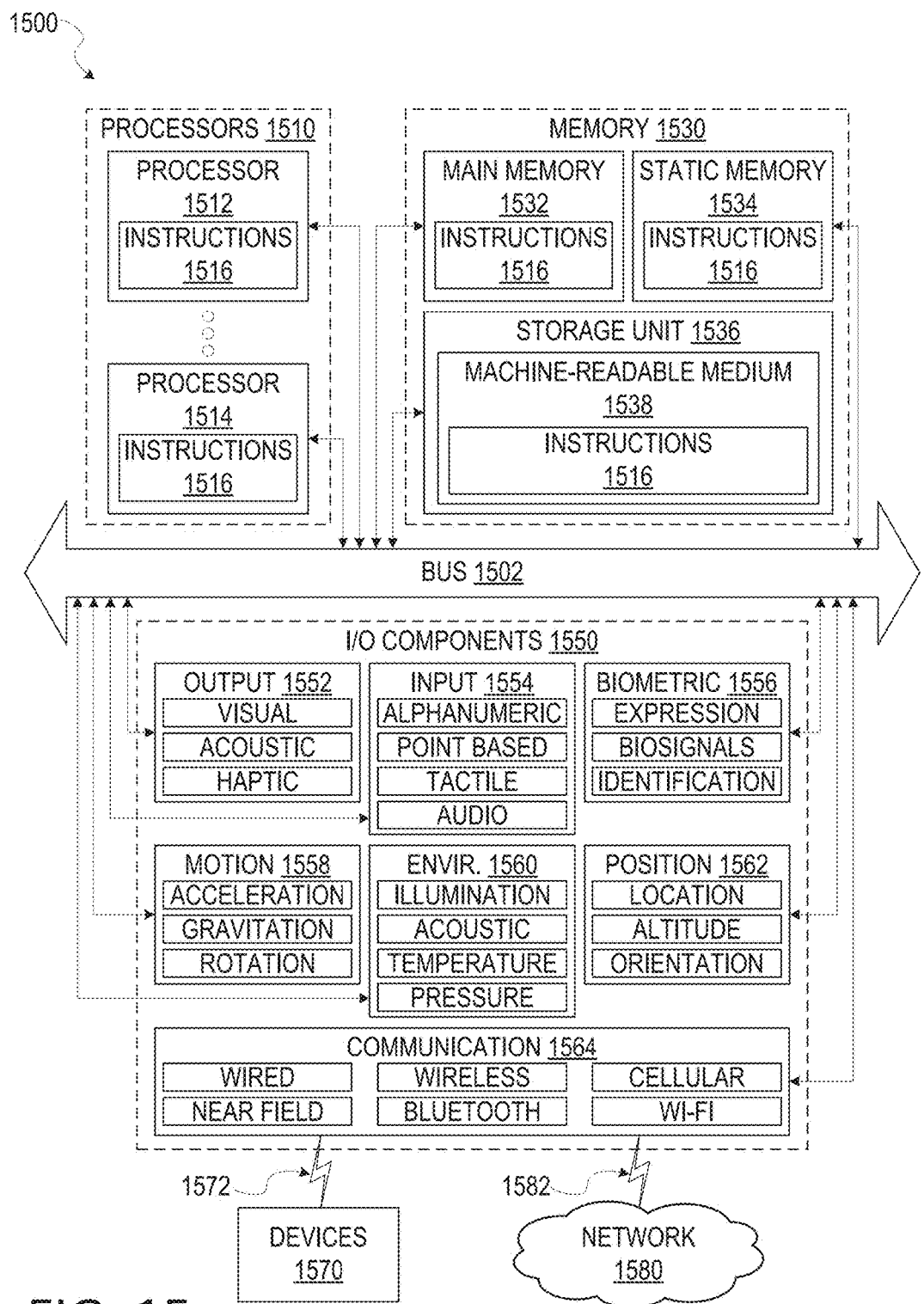
FIG. 15 is a block diagram illustrating components of a machine, according to some example embodiments, configured to read instructions from a machine-readable medium (e.g., a machine-readable storage medium) and perform any one or more of the methodologies discussed herein.

FIG. 15 is a block diagram illustrating components of a machine 1500, according to some example embodiments, configured to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1516 may be used to implement modules or components described herein. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory 1530, and input/output (I/O) components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1512 and a processor 1514 that may execute the instructions 1516. The term "processor" is intended to include multi-core processor that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core processor), multiple processors with a single core, multiple processors with multiples cores, or any combination thereof.

The memory/storage 1530 may include a memory, such as a main memory 1532, a static memory 1534, or other memory, and a storage unit 1536, both accessible to the processors 1510 such as via the bus 1502. The storage unit 1536 and memory 1532, 1534 store the instructions 1516 embodying any one or more of the methodologies or functions described herein. The instructions 1516 may also reside, completely or partially, within the memory 1532, 1534, within the storage unit 1536, within at least one of the processors 1510 (e.g., within the processor's cache memory), or any suitable combination thereof, during execution thereof by the machine 1500. Accordingly, the memory 1532, 1534, the storage unit 1536, and the memory of processors 1510 are examples of machine-readable media 1538.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1550 may include a wide variety of components to receive input, provide output, produce output, transmit information, exchange information, capture measurements, and so on. The specific input/output (I/O) components 1550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1550 may include many other components that are not shown in FIG. 15. The input/output (I/O) components 1550 are grouped according to functionality merely for simplifying the following discussion and the grouping is in no way limiting. In various example embodiments, the input/output (I/O) components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1550 may include communication components 1564 operable to couple the machine 1500 to a network 1580 or devices 1570 via a coupling 1582 and a coupling 1572 respectively. For example, the communication components 1564 may include a network interface component or other suitable device to interface with the network 1580. In further examples, the communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1562, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:
1. A system comprising:
one or more memories:
one or more hardware processors; and
an asset player module incorporated into the one or more memories and, executable by the one or more hardware processors, and configured to perform operations during a time interval between a first frame and a second frame of a game or video to generate media output for the second frame, the operations comprising:
identifying a playable asset configuration for a first playable asset associated with media, the playable asset configuration including a first graph configuration identifying a plurality of processing nodes connected by at least one directed edge, each node in the graph configuration representing a media processing component configured to modify one or more media inputs to generate the media output, the first playable asset accepting one or more input media components;
constructing and altering a graph in the memory based on the first graph configuration and a plurality of events from a game system that occurred prior to the first frame;
receiving a first set of media inputs and preparing the first set of media inputs and other data for the graph;
executing the media processing components in an order based on the graph configuration;
using the first set of media inputs and the other data as the one or more input media components;
based on said executing, performing the generating of the media output for playing by a conventional media player.

2. The system of claim 1, wherein at least one media input of the first set of media inputs is a second playable asset that includes a second playable graph configuration.

3. The system of claim 2, wherein constructing the graph is further based on the second graph configuration of the second playable asset, the graph including at least the first playable graph configuration and the second playable graph configuration.

4. The system of claim 3, wherein the first playable asset is associated with a first media type, wherein the second media asset is associated with a second media type different than the first media type, wherein executing the media processing components further includes:
 identifying the first media type for presentation; and
 executing only media components in the graph associated with the first media type, thereby excluding media processing components in the graph associated with the second media type.

5. The system of claim 1, wherein the first playable asset identifies a plurality of states and a plurality of secondary playable assets, each state in the plurality of states is associated with one of the secondary playable assets of the plurality of secondary playable assets.

6. The system of claim 4, wherein executing the media processing components further includes:
 identifying an active state of the first playable asset, the active state identifying one of the plurality of states; and
 executing only the media processing components in the graph associated with the playable asset of the plurality of playable assets associated with the active state, thereby excluding media processing components in the graph of the other playable assets of the plurality of playable assets.

7. The system of claim 1, wherein the first playable asset also identifies a synchronizer media processing component configured to temporally synchronize two or more inputs.

8. A computer-implemented method comprising:
 performing operations during a time interval between a first frame and a second frame of a game or video, the operations comprising:
 identifying a playable asset configuration for a first playable asset associated with media, the playable asset configuration including a first graph configuration identifying a plurality of processing nodes connected by at least one directed edge, each node in the graph configuration representing a media processing component configured to modify one or more media inputs to generate the media output, the first playable asset accepting one or more input media components;
 constructing and altering a graph in a memory based on the first graph configuration and a plurality of events from a game system that occurred prior to the first frame;
 receiving a first set of media inputs and preparing the first set of media inputs and other data for the graph;
 executing the media processing components in an order based on the graph configuration;
 using the first set of media inputs and the other data as the one or more input media components;
 based on said executing, performing the generating of the media output for playing by a conventional media player.

9. The method of claim 8, wherein at least one media input of the first set of media inputs is a second playable asset that includes a second playable graph configuration.

10. The method of claim 9, wherein constructing the graph is further based on the second graph configuration of the second playable asset, the graph including at least the first playable graph configuration and the second playable graph configuration.

11. The method of claim 10, wherein the first playable asset is associated with a first media type, wherein the second media asset is associated with a second media type different than the first media type, wherein executing the media processing components further includes:
 identifying the first media type for presentation; and
 executing only media components in the graph associated with the first media type, thereby excluding media processing components in the graph associated with the second media type.

12. The method of claim 8, wherein the first playable asset identifies a plurality of states and a plurality of secondary playable assets, each state in the plurality of states is associated with one of the secondary playable assets of the plurality of secondary playable assets.

13. The method of claim 12; wherein executing the media processing components further includes:
 identifying an active state of the first playable asset, the active state identifying one of the plurality of states; and
 executing only the media processing components in the graph associated with the playable asset of the plurality of playable assets associated with the active state, thereby excluding media processing components in the graph of the other playable assets of the plurality of playable assets.

14. The method of claim 8, wherein the first playable asset also identifies a synchronizer media processing component configured to temporally synchronize two or more inputs.

15. A non-transitory machine-readable medium storing processor-executable instructions which, when executed by a processor, cause the processor to perform operations during a time interval between a first frame and a second frame of a game or video, the operations comprising:
 identifying a playable asset configuration for a first playable asset associated with media, the playable asset configuration including a first graph configuration identifying a plurality of processing nodes connected by at least one directed edge, each node in the graph configuration representing a media processing component configured to modify one or more media inputs to generate the media output, the first playable asset accepting one or more input media components;
 constructing and altering a graph in a memory based on the first graph configuration and a plurality of events from a game system that occurred prior to the first frame;
 receiving a first set of media inputs and preparing the first set of media inputs and other data for the graph;
 executing the media processing components in an order based on the graph configuration and using the first set of media inputs and the other data as the one or more input media components;
 based on said executing, performing the generating of the media output for playing by a conventional media player.

16. The machine-readable medium of claim 15, wherein at least one media input of the first set of media inputs is a second playable asset that includes a second playable graph configuration.

17. The machine-readable medium of claim 16, wherein the first playable asset is associated with a first media type, wherein the second media asset is associated with a second media type different than the first media type, wherein executing the media processing components further includes:
- identifying the first media type for presentation; and
- executing only media components in the graph associated with the first media type, thereby excluding media processing components in the graph associated with the second media type.

18. The machine-readable medium of claim 15, wherein the first playable asset identifies a plurality of states and a plurality of playable assets, each state in the plurality of states is associated with one of the playable assets of the plurality of playable assets.

19. The machine-readable medium of claim 18, wherein executing the media processing components further includes:
- identifying an active state of the first playable asset, the active state identifying one of the plurality of states; and
- executing only the media processing components in the graph associated with the playable asset of the plurality of playable assets associated with the active state, thereby excluding media processing components in the graph of the other playable assets of the plurality of playable assets.

20. The machine-readable medium of claim 15, wherein the first playable asset also identifies a synchronizer media processing component configured to temporally synchronize two or more inputs.

* * * * *

UNITED STATES PATENT AND TRADEMARK OFFICE
CERTIFICATE OF CORRECTION

PATENT NO. : 10,478,720 B2
APPLICATION NO. : 15/460004
DATED : November 19, 2019
INVENTOR(S) : Gauthier et al.

Page 1 of 1

It is certified that error appears in the above-identified patent and that said Letters Patent is hereby corrected as shown below:

In the Claims

In Column 28, Line 38, in Claim 1, delete "memories:" and insert --memories;-- therefor In Column 30, Line 21, in Claim 13, delete "12;" and insert --12,-- therefor Signed and Sealed this
Sixteenth Day of February, 2021

Drew Hirshfeld
*Performing the Functions and Duties of the
Under Secretary of Commerce for Intellectual Property and
Director of the United States Patent and Trademark Office*